United States Patent
Furuta

(10) Patent No.: US 10,033,900 B2
(45) Date of Patent: Jul. 24, 2018

(54) CORRECTION METHOD FOR IMAGE FORMING APPARATUS

(71) Applicant: CANON KABUSHIKI KAISHA, Tokyo (JP)

(72) Inventor: Yasutomo Furuta, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/222,692

(22) Filed: Jul. 28, 2016

(65) Prior Publication Data

US 2017/0041489 A1  Feb. 9, 2017

(30) Foreign Application Priority Data

Aug. 5, 2015  (JP) ................................ 2015-155192

(51) Int. Cl.
| | |
|---|---|
| *H04N 1/04* | (2006.01) |
| *H04N 1/06* | (2006.01) |
| *H04N 1/113* | (2006.01) |
| *G03G 15/043* | (2006.01) |
| *G03G 15/04* | (2006.01) |

(52) U.S. Cl.
CPC ........ *H04N 1/0408* (2013.01); *G03G 15/043* (2013.01); *G03G 15/04072* (2013.01); *H04N 1/06* (2013.01); *H04N 1/113* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 8,837,011 B2 | 9/2014 | Takikawa et al. | . H04N 1/40093 |
| 8,917,305 B2 | 12/2014 | Nakahata et al. | . G03G 15/0415 |
| 9,261,809 B2 | 2/2016 | Furuta | .............. G03G 15/04072 |

(Continued)

FOREIGN PATENT DOCUMENTS

JP  2012-098622  5/2012

OTHER PUBLICATIONS

U.S. Appl. No. 15/222,687, filed Jul. 28, 2016.

(Continued)

*Primary Examiner* — Helen Zong
(74) *Attorney, Agent, or Firm* — Fitzpatrick, Cella, Harper & Scinto

(57) ABSTRACT

A correction method for an image forming apparatus including a light source, a photosensitive member configured to rotate in a first direction, and a deflecting unit configured to deflect light beams emitted from the light source in a second direction orthogonal to the first direction to form scanning lines, the correction method including: a first correction step of correcting sparseness and denseness of density by moving a predetermined pixel in the first direction to output a pixel value of the predetermined pixel; and a second correction step of correcting the pixel value of the predetermined pixel by, when the pixel value of the predetermined pixel moved in the second direction is equal to or less than a predetermined value, adding the pixel value to a pixel value of a subsequent pixel of the predetermined pixel in the second direction without outputting the pixel value of the predetermined pixel.

1 Claim, 25 Drawing Sheets

(56) References Cited

U.S. PATENT DOCUMENTS

2016/0147170 A1    5/2016  Furuta ................. G03G 15/043
2016/0274481 A1*   9/2016  Kawanabe ........... G03G 15/043

OTHER PUBLICATIONS

U.S. Appl. No. 15/210,365, filed Jul. 14, 2016, Inventors: Izuru Horiuchi, Yasutomo Furuta, Ryuichi Araki.
U.S. Appl. No. 15/210,380, filed Jul. 14, 2016, Inventor: Yasutomo Furuta.
U.S. Appl. No. 15/210,389, filed Jul. 14, 2016, Inventors: Yasutomo Furuta, Izuru Horiuchi, Ryuichi Araki.
U.S. Appl. No. 15/210,394, filed Jul. 14, 2016, Inventor: Ryuichi Araki.
U.S. Appl. No. 15/210,402, filed Jul. 14, 2016, Inventor: Izuru Horiuchi.
U.S. Appl. No. 15/210,365, filed Jul. 14, 2016.
U.S. Appl. No. 15/210,380, filed Jul. 14, 2016.
U.S. Appl. No. 15/210,389, filed Jul. 14, 2016.
U.S. Appl. No. 15/210,394, filed Jul. 14, 2016.
U.S. Appl. No. 15/210,402, filed Jul. 14, 2016.

* cited by examiner

SCANNING POSITIONS ARE SHIFTED IN ADVANCE DIRECTION

SCANNING POSITIONS ARE SHIFTED IN RETURN DIRECTION

SCANNING POSITIONS ARE DENSE

SCANNING POSITIONS ARE SPARSE

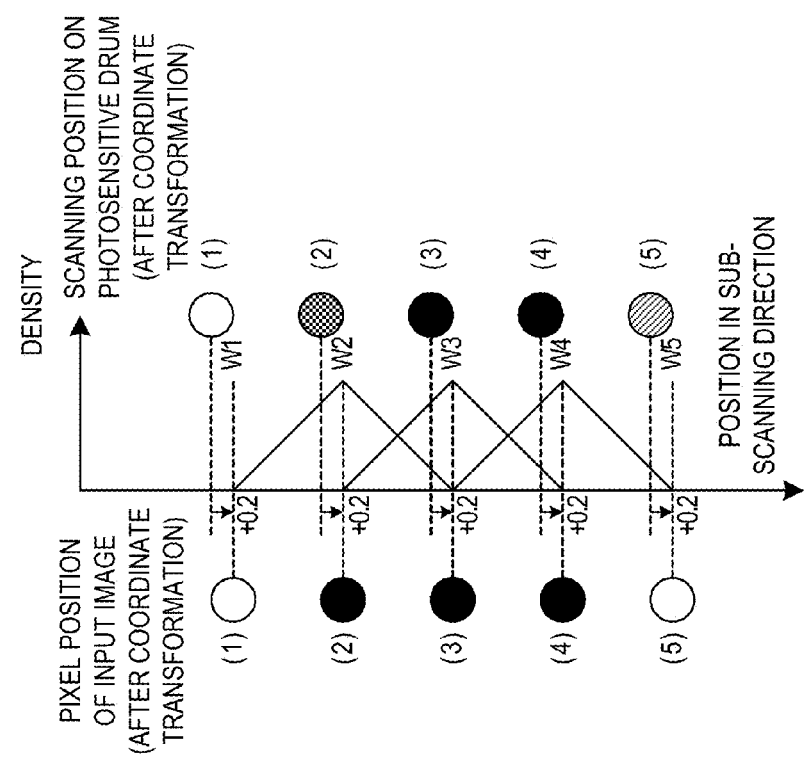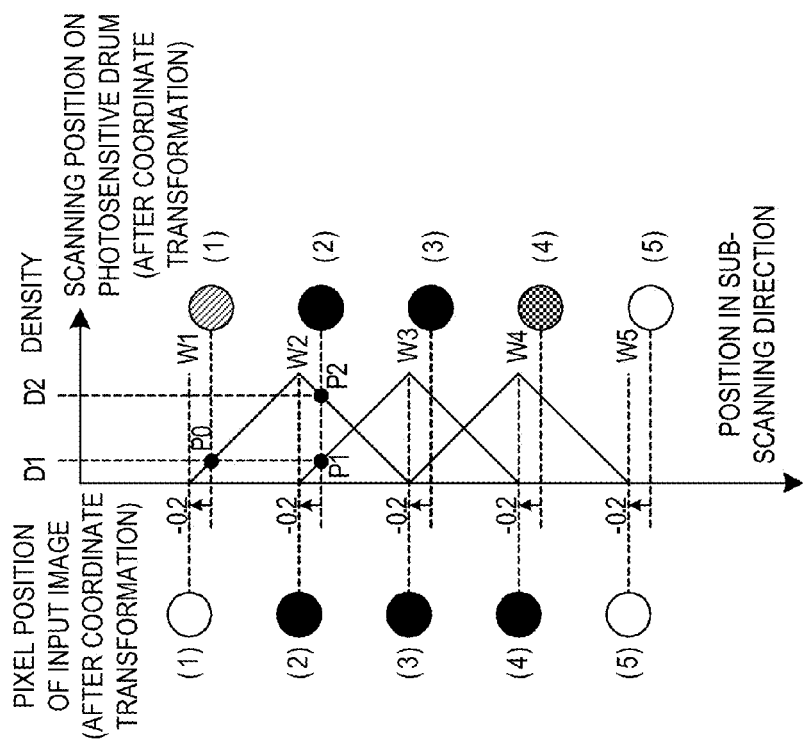

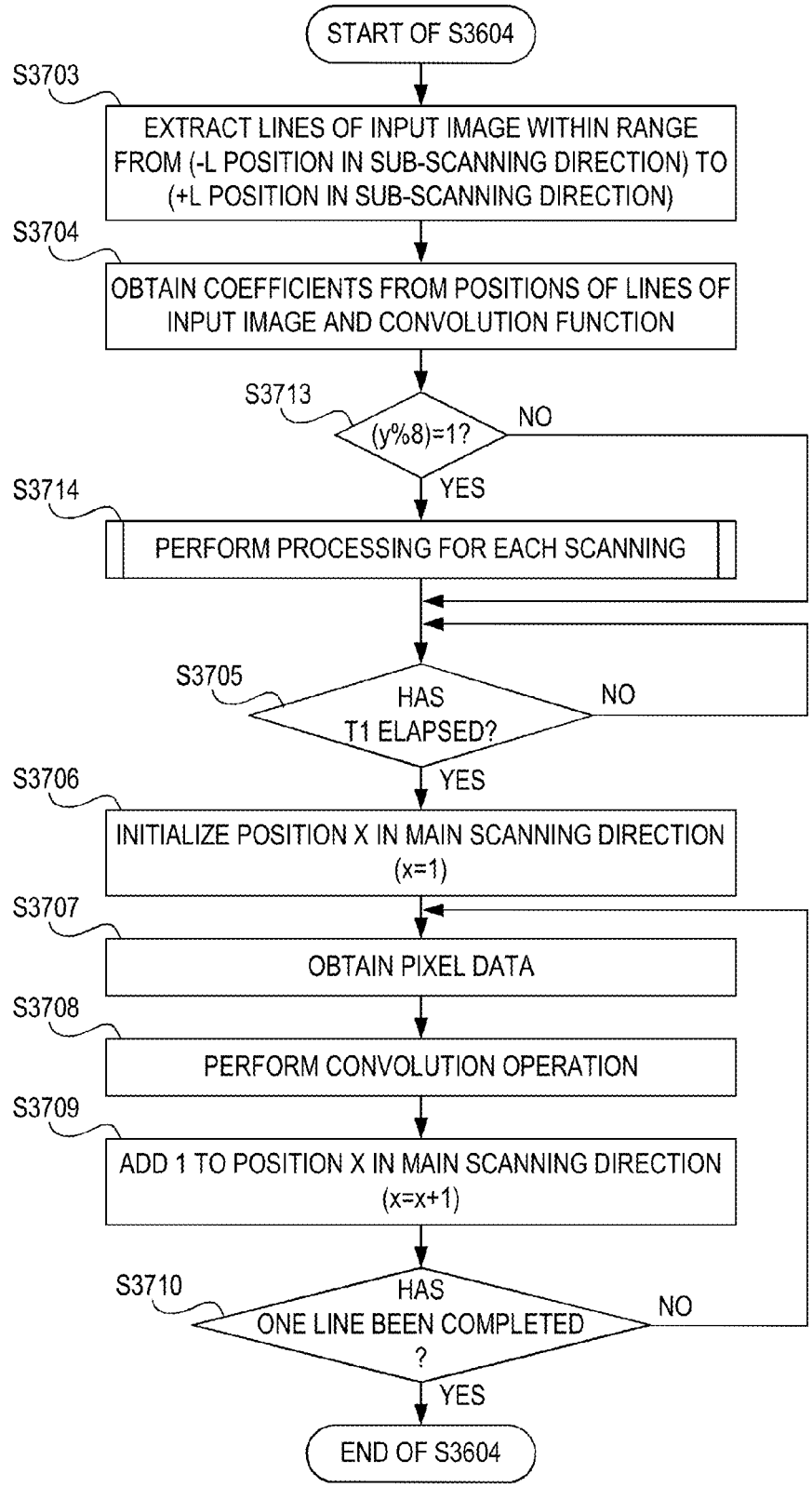

FIG. 16A

|        | N=0 | N=1 | N=2 | N=3 | N=4 | N=5 | N=6 | N=7 | N=8 | N=9 | N=10 |
|--------|-----|-----|-----|-----|-----|-----|-----|-----|-----|-----|------|
| 1 LINE |     |     |     |     |     |     |     |     |     |     |      |
| 2 LINE |     |     |     |     |     |     |     |     |     |     |      |
| 3 LINE | 15  | 15  | 15  | 15  | 15  | 15  | 15  | 15  | 15  | 15  | 15   |
| 4 LINE | 15  | 15  | 15  | 15  | 15  | 15  | 15  | 15  | 15  | 15  | 15   |
| 5 LINE |     |     |     |     |     |     |     |     |     |     |      |
| 6 LINE |     |     |     |     |     |     |     |     |     |     |      |

FIG. 16B

|        | N=0 | N=1 | N=2 | N=3 | N=4 | N=5 | N=6 | N=7 | N=8 | N=9 | N=10 |
|--------|-----|-----|-----|-----|-----|-----|-----|-----|-----|-----|------|
| 1 LINE |     |     |     |     |     |     |     |     |     |     |      |
| 2 LINE |     |     |     |     |     |     |     |     |     |     |      |
| 3 LINE | 13  | 13  | 13  | 13  | 13  | 13  | 13  | 13  | 13  | 13  | 13   |
| 4 LINE | 15  | 15  | 15  | 15  | 15  | 15  | 15  | 15  | 15  | 15  | 15   |
| 5 LINE | 2   | 2   | 2   | 2   | 2   | 2   | 2   | 2   | 2   | 2   | 2    |
| 6 LINE |     |     |     |     |     |     |     |     |     |     |      |

FIG. 16C

|        | N=0 | N=1 | N=2 | N=3 | N=4 | N=5 | N=6 | N=7 | N=8 | N=9 | N=10 |
|--------|-----|-----|-----|-----|-----|-----|-----|-----|-----|-----|------|
| 1 LINE |     |     |     |     |     |     |     |     |     |     |      |
| 2 LINE |     |     |     |     |     |     |     |     |     |     |      |
| 3 LINE | 13  | 13  | 13  | 13  | 13  | 13  | 13  | 13  | 13  | 13  | 13   |
| 4 LINE | 15  | 15  | 15  | 15  | 15  | 15  | 15  | 15  | 15  | 15  | 15   |
| 5 LINE | 0   | 0   | 6   | 0   | 0   | 6   | 0   | 0   | 6   | 0   | 0    |
| 6 LINE |     |     |     |     |     |     |     |     |     |     |      |

FIG. 16D

|        | N=0 | N=1 | N=2 | N=3 | N=4 | N=5 | N=6 | N=7 | N=8 | N=9 | N=10 |
|--------|-----|-----|-----|-----|-----|-----|-----|-----|-----|-----|------|
| 1 LINE |     |     |     |     |     |     |     |     |     |     |      |
| 2 LINE |     |     |     |     |     |     |     |     |     |     |      |
| 3 LINE | 13  | 13  | 13  | 13  | 13  | 13  | 13  | 13  | 13  | 13  | 13   |
| 4 LINE | 15  | 15  | 15  | 15  | 15  | 15  | 15  | 15  | 15  | 15  | 15   |
| 5 LINE | 0   | 0   | 0   | 8   | 0   | 0   | 6   | 0   | 0   | 0   | 8    |
| 6 LINE |     |     |     |     |     |     |     |     |     |     |      |

FIG. 17

| N | THRESHOLD VALUE L | Fpix + MDATA | AFTER-PROCESSING Fpix |
|---|---|---|---|
| 0 | 5(1) | 2 | 0 |
| 1 | 5(1) | 4 | 0 |
| 2 | 8(4) | 6 | 0 |
| 3 | 7(3) | 8 | 8 |
| 4 | 6(2) | 2 | 0 |
| 5 | 7(3) | 4 | 0 |
| 6 | 5(1) | 6 | 6 |
| 7 | 6(2) | 2 | 0 |
| 8 | 5(1) | 4 | 0 |
| 9 | 7(3) | 6 | 0 |
| 10 | 6(2) | 8 | 8 |

FIG. 19A

| INPUT DATA Fpix+MDATA | OUTPUT DATA GDATA | ERROR AMOUNT MDATA' |
|---|---|---|
| 0 | 0 | 0.00 |
| 1 | 3 | 0.00 |
| 2 | 3 | 0.20 |
| 3 | 4 | 0.50 |
| 4 | 4 | 0.25 |
| 5 | 5 | 0.00 |
| 6 | 6 | 0.00 |
| 7 | 7 | 0.00 |
| 8 | 8 | 0.00 |
| 9 | 9 | 0.00 |
| 10 | 10 | 0.00 |
| 11 | 11 | 0.00 |
| 12 | 12 | 0.00 |
| 13 | 13 | 0.00 |
| 14 | 14 | 0.00 |
| 15 | 15 | 0.00 |

FIG. 19B

|  | N=0 | N=1 | N=2 | N=3 | N=4 | N=5 | N=6 | N=7 | N=8 | N=9 | N=10 |
|---|---|---|---|---|---|---|---|---|---|---|---|
| 1 LINE |  |  |  |  |  |  |  |  |  |  |  |
| 2 LINE |  |  |  |  |  |  |  |  |  |  |  |
| 3 LINE | 13 | 13 | 13 | 13 | 13 | 13 | 13 | 13 | 13 | 13 | 13 |
| 4 LINE | 15 | 15 | 15 | 15 | 15 | 15 | 15 | 15 | 15 | 15 | 15 |
| 5 LINE | 3 | 3 | 3 | 3 | 3 | 4 | 3 | 3 | 3 | 4 | 3 |
| 6 LINE |  |  |  |  |  |  |  |  |  |  |  |

FIG. 21

A: MOVED BY 1/8 PIXEL
IMAGE DATA IN A

| 13 | 13 | 13 | 13 | 13 | 13 | 13 | 13 |
|----|----|----|----|----|----|----|----|
| 15 | 15 | 15 | 15 | 15 | 15 | 15 | 15 |
| 2  | 2  | 2  | 2  | 2  | 2  | 2  | 2  |
|    |    |    |    |    |    |    |    |
| 13 | 13 | 13 | 13 | 13 | 13 | 13 | 13 |
| 15 | 15 | 15 | 15 | 15 | 15 | 15 | 15 |
| 2  | 2  | 2  | 2  | 2  | 2  | 2  | 2  |
|    |    |    |    |    |    |    |    |

B: LIGHT INTENSITY
WITHOUT PIXEL MOVEMENT
IMAGE DATA IN B

| 15 | 15 | 15 | 15 | 15 | 15 | 15 | 15 |
|----|----|----|----|----|----|----|----|
| 15 | 15 | 15 | 15 | 15 | 15 | 15 | 15 |
|    |    |    |    |    |    |    |    |
| 15 | 15 | 15 | 15 | 15 | 15 | 15 | 15 |
| 15 | 15 | 15 | 15 | 15 | 15 | 15 | 15 |
|    |    |    |    |    |    |    |    |

FIG. 22

|      | 0 | 1 | 2 | 3 | 4 | 5 | 6 | 7 | 8 | 9 | 10 | 11 | 12 | 13 | 14 | 15 |
|------|---|---|---|---|---|---|---|---|---|---|----|----|----|----|----|----|
| 0000 | 0 | 0 | 0 | 0 | 0 | 0 | 0 | 0 | 0 | 0 | 0  | 0  | 0  | 0  | 0  | 0  |
| 0001 | 0 | 0 | 0 | 0 | 0 | 0 | 0 | 0 | 0 | 0 | 0  | 0  | 0  | 0  | 1  | 1  |
| 0010 | 0 | 0 | 0 | 0 | 0 | 0 | 0 | 0 | 0 | 0 | 0  | 0  | 0  | 1  | 1  | 1  |
| 0011 | 0 | 0 | 0 | 0 | 0 | 0 | 0 | 0 | 0 | 0 | 0  | 0  | 1  | 1  | 1  | 1  |
| 0100 | 0 | 0 | 0 | 0 | 0 | 0 | 0 | 0 | 0 | 0 | 0  | 1  | 1  | 1  | 1  | 1  |
| 0101 | 0 | 0 | 0 | 0 | 0 | 0 | 0 | 0 | 0 | 0 | 1  | 1  | 1  | 1  | 1  | 1  |
| 0110 | 0 | 0 | 0 | 0 | 0 | 0 | 0 | 0 | 0 | 1 | 1  | 1  | 1  | 1  | 1  | 1  |
| 0111 | 0 | 0 | 0 | 0 | 0 | 0 | 0 | 0 | 1 | 1 | 1  | 1  | 1  | 1  | 1  | 1  |
| 1000 | 0 | 0 | 0 | 0 | 0 | 0 | 0 | 1 | 1 | 1 | 1  | 1  | 1  | 1  | 1  | 1  |
| 1001 | 0 | 0 | 0 | 0 | 0 | 0 | 1 | 1 | 1 | 1 | 1  | 1  | 1  | 1  | 1  | 1  |
| 1010 | 0 | 0 | 0 | 0 | 0 | 1 | 1 | 1 | 1 | 1 | 1  | 1  | 1  | 1  | 1  | 1  |
| 1011 | 0 | 0 | 0 | 0 | 1 | 1 | 1 | 1 | 1 | 1 | 1  | 1  | 1  | 1  | 1  | 1  |
| 1100 | 0 | 0 | 0 | 1 | 1 | 1 | 1 | 1 | 1 | 1 | 1  | 1  | 1  | 1  | 1  | 1  |
| 1101 | 0 | 0 | 1 | 1 | 1 | 1 | 1 | 1 | 1 | 1 | 1  | 1  | 1  | 1  | 1  | 1  |
| 1110 | 0 | 1 | 1 | 1 | 1 | 1 | 1 | 1 | 1 | 1 | 1  | 1  | 1  | 1  | 1  | 1  |
| 1111 | 1 | 1 | 1 | 1 | 1 | 1 | 1 | 1 | 1 | 1 | 1  | 1  | 1  | 1  | 1  | 1  |

CORRECTION METHOD FOR IMAGE FORMING APPARATUS

BACKGROUND OF THE INVENTION

Field of the Invention

The present invention relates to a correction method for an image forming apparatus, for correcting distortion and uneven image density of an image during image formation of a two-dimensional image by the image forming apparatus, e.g., a digital copying machine, a multifunctional peripheral, or a laser printer.

Description of the Related Art

In an electrophotographic image forming apparatus such as a laser printer or a copying machine, there has been generally known a configuration to form a latent image on a photosensitive member with the use of a light scanning device configured to perform scanning with a laser beam. In the light scanning device of a laser scanning type, a laser beam collimated with the use of a collimator lens is deflected by a rotary polygon mirror, and the deflected laser beam is formed into an image on a photosensitive member with the use of an elongated fθ lens. Further, there is known multi-beam scanning in which a laser light source having a plurality of light emitting points is included in one package so as to perform scanning with a plurality of laser beams simultaneously.

Meanwhile, in order to form a satisfactory image without uneven image density and banding (a striped pattern formed by light and shade in image density), it is desired that distances between scanning lines of which positions to be scanned with a laser beam are adjacent to each other in a rotational direction of the photosensitive member be equal to each other. However, the distances between the scanning lines are varied due to a plurality of factors described below. The distances between the scanning lines on the photosensitive member are varied by, for example, a fluctuation in a surface speed of the photosensitive member, or a rotation speed fluctuation of a rotary polygon mirror. Further, the distances between the scanning lines are also varied by a variation in angle of mirror faces of the rotary polygon mirror with respect to a rotary shaft of the rotary polygon mirror and a variation in intervals between light emitting points arranged on a laser light source. To cope with uneven image density and banding caused by such factors, there has been proposed a technology of correcting banding by controlling an exposure amount of the light scanning device. For example, in Japanese Patent Application Laid-Open No. 2012-098622, there is described a configuration in which a beam position detection unit configured to detect a beam position in a sub-scanning direction is arranged in the vicinity of the photosensitive member, and the exposure amount of the light scanning device is adjusted based on scanning distance information obtained from a detected beam position, to thereby make banding less noticeable.

As a configuration to adjust the exposure amount of the light scanning device, there are given a configuration to control the peak light intensity of a light emitting point and a configuration to control the light emission time of each pixel (PWM system). In the PWM system, there has generally been known a light scanning device including a PWM signal generating portion and a drive circuit. The PWM signal generating portion is configured to generate a control signal (PWM signal) for designating on-off of a light emitting point in accordance with image data (pixel value) of each image, and the drive circuit is configured to turn on or off the light emitting point in accordance with the PWM signal generated in the PWM signal generating portion. Similarly to, for example, Japanese Patent Application Laid-Open No. 2012-098622, as a configuration to make banding less noticeable by controlling an exposure amount, there is given a configuration to correct the positions of scanning lines by shifting image data in the sub-scanning direction in accordance with position information in the sub-scanning direction of each scanning line. In this configuration, the movement amount of an image center of gravity can be adjusted with a data value of image data to be added. When the data value is low, a pixel exposed to light in a small exposure amount is added, to thereby minutely move the image center of gravity. Meanwhile, when the data value is high, a pixel exposed to light in a large exposure amount is added, to thereby greatly move the image center of gravity.

In an electrophotographic image forming apparatus, banding is even caused by image positional deviation of from about 2 μm to about 5 μm. For example, in an image forming apparatus having a resolution of 1,200 dpi, the width of one pixel is 21.16 μm, and hence in order to correct the image positional deviation of from about 2 μm to about 5 μm, it is necessary to move an image center of gravity with a resolution of $1/10$ pixel or less. Therefore, when the image center of gravity is moved by increasing or decreasing the exposure amount of each pixel or shifting image data, it is necessary to control each pixel with a small light emission intensity of $1/10$ or less. For example, FIG. 20A is a chart for illustrating laser beam waveforms at a time when a light emitting point (semiconductor laser) is turned on through the PWM system. When the pulse width of a PWM signal is decreased, the light emitting point is not turned on completely (the output of a laser beam does not reach a predetermined setting value), and light intensity shortage occurs. Such phenomenon is referred to as a linearity defect because the light emission intensity does not change linearly with respect to a change in pulse width. FIG. 20B is a graph for showing a relationship between the pulse width of the PWM signal corresponding to a pixel value and the light emission intensity (light intensity of a laser beam) of a light emitting point. The light intensity of a laser beam changes linearly (in a linear function manner) in proportion to the pulse width of the PWM signal. However, it is understood that, of pulse widths of the PWM signal in sixteen stages, the pulse widths in the first to fourth stages (pixel values of from 1 to 4) form a light intensity unstable area in which the light emission intensity does not change linearly with respect to a change in pulse width, with the result that the linearity defect occurs.

Further, the banding correction system of moving an image center of gravity by adding image data as described above has a problem in that, when the linearity defect occurs, an error is caused in an exposure amount of image data to be added, and hence an error occurs also in the movement amount of an image center of gravity. Further, the light intensity decreases to also cause a decrease in image density, with the result that a density fluctuation occurs. FIG. 21 is an illustration of a state of a density fluctuation at a time when the linearity defect occurs when banding correction is performed. In an image area A, the image center of gravity is moved downward in the length direction of FIG. 21 through banding correction. Meanwhile, in an image area B, the image center of gravity is not moved because the image position is located at an ideal position. It is understood that, in the image area A, image density decreases to cause a density fluctuation due to the linearity defect. The details of FIG. 20A, FIG. 20B, and FIG. 21 will be described later.

SUMMARY OF THE INVENTION

The present invention has been made under the above-mentioned circumstances, and it is an object of the present invention to obtain satisfactory image quality by correcting uneven image density of an image, which occurs in a direction corresponding to a rotational direction of a photosensitive member, and preventing the occurrence of density fluctuation due to a linearity defect.

In order to solve the above-mentioned problem, according to one embodiment of the present invention, there is provided a correction method for an image forming apparatus,
   the image forming apparatus comprising:
      a light source comprising a plurality of light emitting points;
      a photosensitive member configured to rotate in a first direction so that a latent image is formed on the photosensitive member with light beams emitted from the light source; and
      a deflecting unit configured to deflect the light beams emitted from the light source to move light spots of the light beams radiated to the photosensitive member in a second direction orthogonal to the first direction to form scanning lines,
   the correction method comprising:
      a first correction step of correcting sparseness and denseness of density in the first direction caused by deviation of the scanning lines in the first direction, by moving a predetermined pixel in the first direction in accordance with the deviation of the scanning lines, and causing a pixel value of the predetermined pixel to be output in accordance with a movement of the predetermined pixel; and
      a second correction step of correcting the pixel value of the predetermined pixel which is output in the first correction step by, when the pixel value of the predetermined pixel moved in the second direction is equal to or less than a predetermined value, adding the pixel value of the predetermined pixel to a pixel value of a pixel subsequent to the predetermined pixel in the second direction without outputting the pixel value of the predetermined pixel.

According to another embodiment of the present invention, there is provided a correction method for an image forming apparatus,
   the image forming apparatus comprising:
      a light source including a plurality of light emitting points;
      a photosensitive member configured to rotate in a first direction so that a latent image is formed on the photosensitive member with light beams emitted from the light source; and
      a deflecting unit configured to deflect the light beams emitted from the light source to move light spots of the light beams radiated to the photosensitive member in a second direction orthogonal to the first direction to form scanning lines,
   the correction method comprising:
      a first correction step of correcting sparseness and denseness of density in the first direction caused by deviation of the scanning lines in the first direction, by moving a predetermined pixel in the first direction in accordance with the deviation of the scanning lines, and causing a pixel value of the predetermined pixel to be output in accordance with a movement of the predetermined pixel; and
      a second correction step of correcting, when a light intensity of light beam emitted from the light source in accordance with the pixel value of the predetermined pixel is less than a predetermined light intensity corresponding to the pixel value, correcting the pixel value of the predetermined pixel to a pixel value at which the light beam of the predetermined light intensity is emitted.

Further features of the present invention will become apparent from the following description of exemplary embodiments with reference to the attached drawings.

BRIEF DESCRIPTION OF THE DRAWINGS

FIG. 12A, FIG. 12B, FIG. 12C, and FIG. 12D are each a diagram for illustrating the filtering for each classification of positional deviation according to the first and second embodiments.

FIG. 13 is a flowchart for illustrating the filtering according to the first and second embodiments.

FIG. 16A, FIG. 16B, FIG. 16C, and FIG. 16D are each a table for showing an example of image data processing according to the first embodiment.

FIG. 17 is a table for showing an example of calculation results of the image data processing according to the first embodiment.

FIG. 19A is an error storage table to be used in image data processing according to the second embodiment.

FIG. 19B is a table for showing an example of the image data processing.

FIG. 21 is a view for showing uneven image density caused by the movement of an image center of gravity in the conventional art.

FIG. 22 is a diagram for showing a conversion table for converting image data (density data) into drive data for generating a PWM signal.

DESCRIPTION OF THE EMBODIMENTS

Exemplary embodiments of the present invention will be described in detail below in an illustrative manner with reference to the drawings. A direction of an axis of rotation of a photosensitive drum, which is a direction in which scanning is performed with a laser beam, is defined as a main scanning direction that is a second direction, and a rotational direction of the photosensitive drum, which is a direction substantially orthogonal to the main scanning direction, is defined as a sub-scanning direction which is a first direction.

Figure 20A:
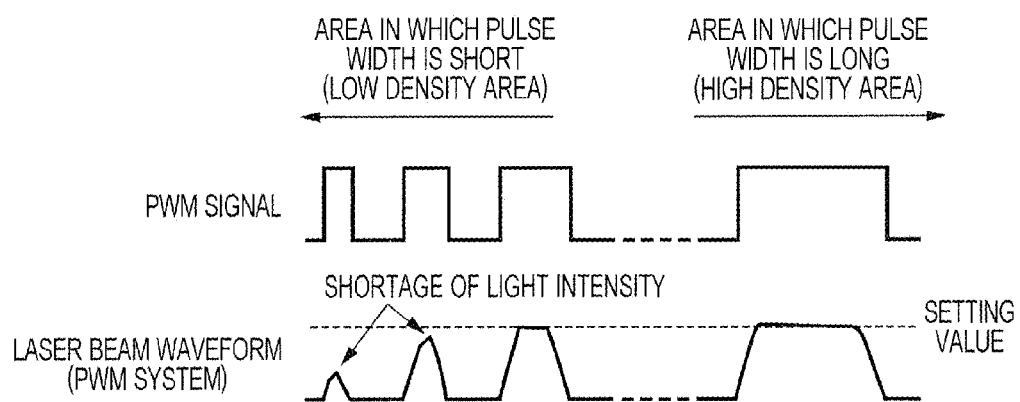
FIG. 20A is a chart for illustrating a state of an error of a light intensity of a laser beam in a PWM system in the conventional art.

First, prior to describing the embodiments described later, detailed description is given with reference to FIG. 20A, FIG. 20B, and FIG. 21 of the problem in that image density decreases due to a linearity defect, and as a result, a density fluctuation occurs. As described above, in an electrophotographic image forming apparatus, banding is even caused by image positional deviation of from about 2 μm to about 5 μm. For example, in an image forming apparatus having a resolution of 1,200 dpi, the width of one pixel is 21.16 μm. Hence, in order to correct the image positional deviation of from about 2 μm to about 5 μm, it is necessary to move an image center of gravity with a resolution of 1/10 pixel or less. Therefore, when the image center of gravity is moved by increasing or decreasing the exposure amount of each pixel or shifting image data, it is necessary to control each pixel with a small light emission intensity of 1/10 or less.

When each pixel is exposed to light in a small exposure amount through the PWM system described above, the light emission time of a light emitting point is shortened, and hence it is difficult to control the light intensity of a laser beam with high accuracy due to factors, e.g., light emission delay that is caused when a light emitting point is turned on or off. FIG. 20A is a chart for illustrating laser beam waveforms at a time when a light emitting point (semiconductor laser) is turned on through the PWM system. In FIG. 20A, the waveform on the upper side represents a PWM signal, and the pulse width of the PWM signal changes from a short state to a long state from the left side to the right side of FIG. 20A. An area in which the pulse width is short is an area in which the density of a pixel for forming an image is low (low-density area), and an area in which the pulse width is long is an area in which the density of a pixel for forming an image is high (high-density area). The waveform on the lower side of FIG. 20A represents the waveform of a laser beam emitted from a light emitting point in accordance with the PWM signal. In each laser beam waveform corresponding to the PWM signal, the horizontal axis represents a time during which a laser beam is emitted, and the vertical axis represents the light intensity of a laser beam. The state in which the waveform of a laser beam reaches a predetermined setting value corresponds to the state in which the light emitting point is turned on completely. As illustrated in FIG. 20A, it is understood that, in the area in which the pulse width of the PWM signal is short (low-density area), the light emitting point is not turned on completely (the output of the laser beam does not reach the predetermined setting value), and light intensity shortage occurs. Such phenomenon is referred to as a linearity defect because the light emission intensity of a light emitting point does not change linearly with respect to a change in pulse width of the PWM signal.

Figure 20B:
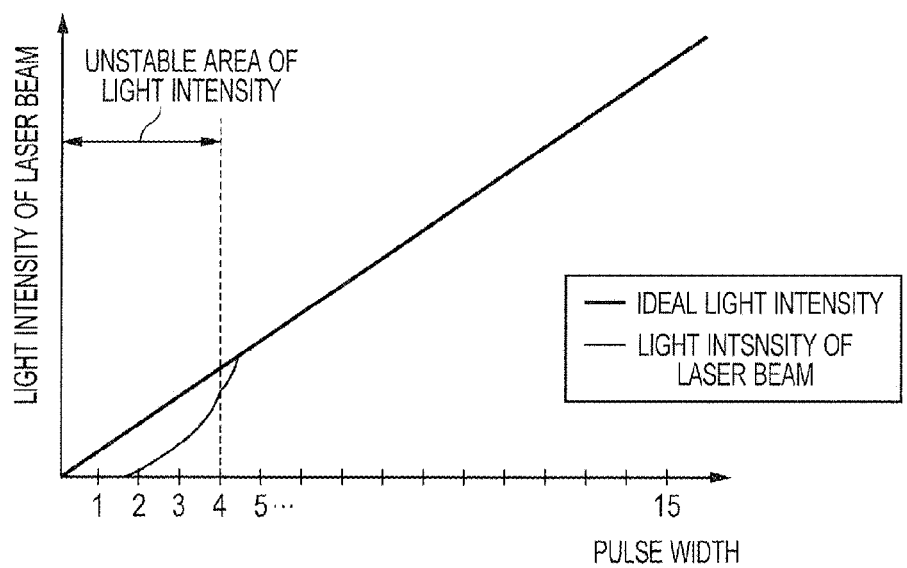
FIG. 20B is a graph for showing a state of a density fluctuation caused by a linearity defect.

FIG. 20B is a graph for showing a relationship between the pulse width of the PWM signal corresponding to a pixel value and the light emission intensity (integral light intensity) of a light emitting point. The vertical axis represents the light intensity of a laser beam, and the horizontal axis represents the pulse width of the PWM signal. The pulse width of the PWM signal shown in FIG. 20B is expressed with four bits. That is, the pixel value of one pixel has a resolution of four bits (0 to 15), and hence the pulse width is controlled in sixteen stages of from 0 to 15. Further, the light intensity of a laser beam changes linearly in proportion to the pulse width of the PWM signal as in the ideal light intensity represented by the thick line of FIG. 20B. However, it is understood that, of the pulse widths of the PWM signal in the first to fifteenth stages for turning on a light emitting point, the pulse widths in the first to fourth stages (corresponding to pixel values of from 1 to 4) form a light intensity unstable area in which the light emission intensity does not change linearly with respect to a change in pulse width as in the light intensity of a laser beam represented by the thin line of FIG. 20B, with the result that the linearity defect occurs. Meanwhile, it is understood that, in the light intensity of a laser beam having pulse widths in the fifth stage (pixel value of 5) or higher, the light emission intensity changes linearly with respect to a change in pulse width, with the result that the linearity defect does not occur.

Further, in the banding correction system of moving an image center of gravity by adding image data as described above, there is a problem in that, when the linearity defect occurs, an error is caused in an exposure amount of image data to be added, and hence an error also occurs in the movement amount of an image center of gravity. Further, the light intensity decreases to also cause a decrease in image density, with the result that a density fluctuation occurs. FIG. 21 is an illustration of a state of a density fluctuation at a time when the linearity defect occurs when banding correction is performed. Two tables on the right side of FIG. 21 are each a table for showing image data to be printed on a recording material. In each table, the vertical direction represents a printing line in a length direction (sub-scanning direction) of a recording material, and the horizontal direction represents pixels in a width direction (main scanning direction) in each printing line of the recording material. The numerical values in the table represent image data of each pixel (density value expressed in 16 levels of from 0 to 15). An image formed based on the table on the upper side (image data in A of FIG. 21) corresponds to an image area A on the left side (1/8 pixel movement). Meanwhile, an image formed based on the table on the lower side (image data in B of FIG. 21) corresponds to an image area B on the left side (no pixel movement). In FIG. 21, there is shown an example in which an image center of gravity is moved downward in the length direction by reducing, relative to the image data of the table on the lower right side, the image data (density value) in the second and sixth lines by 2 and adding the reduced image data (density value) to the fourth and eighth lines by 2 as shown in the table on the upper right side. With this, the image center of gravity is moved toward the third line by ⅛ pixel (=2/16). In this configuration, the movement amount of an image center of gravity can be adjusted with a data value of image data to be added. As described above, in the image area A of FIG. 21, the image center of gravity is moved downward in the length direction through banding correction. Meanwhile, in the image area B, the image position is an ideal position, and hence the image center of gravity is not moved. As a result, as shown in FIG. 21, it is understood that, in the image area A, the image density decreases relative to that of the image area B, and a density fluctuation occurs.

First Embodiment

<Overall Configuration of Image Forming Apparatus>

Figure 1A:
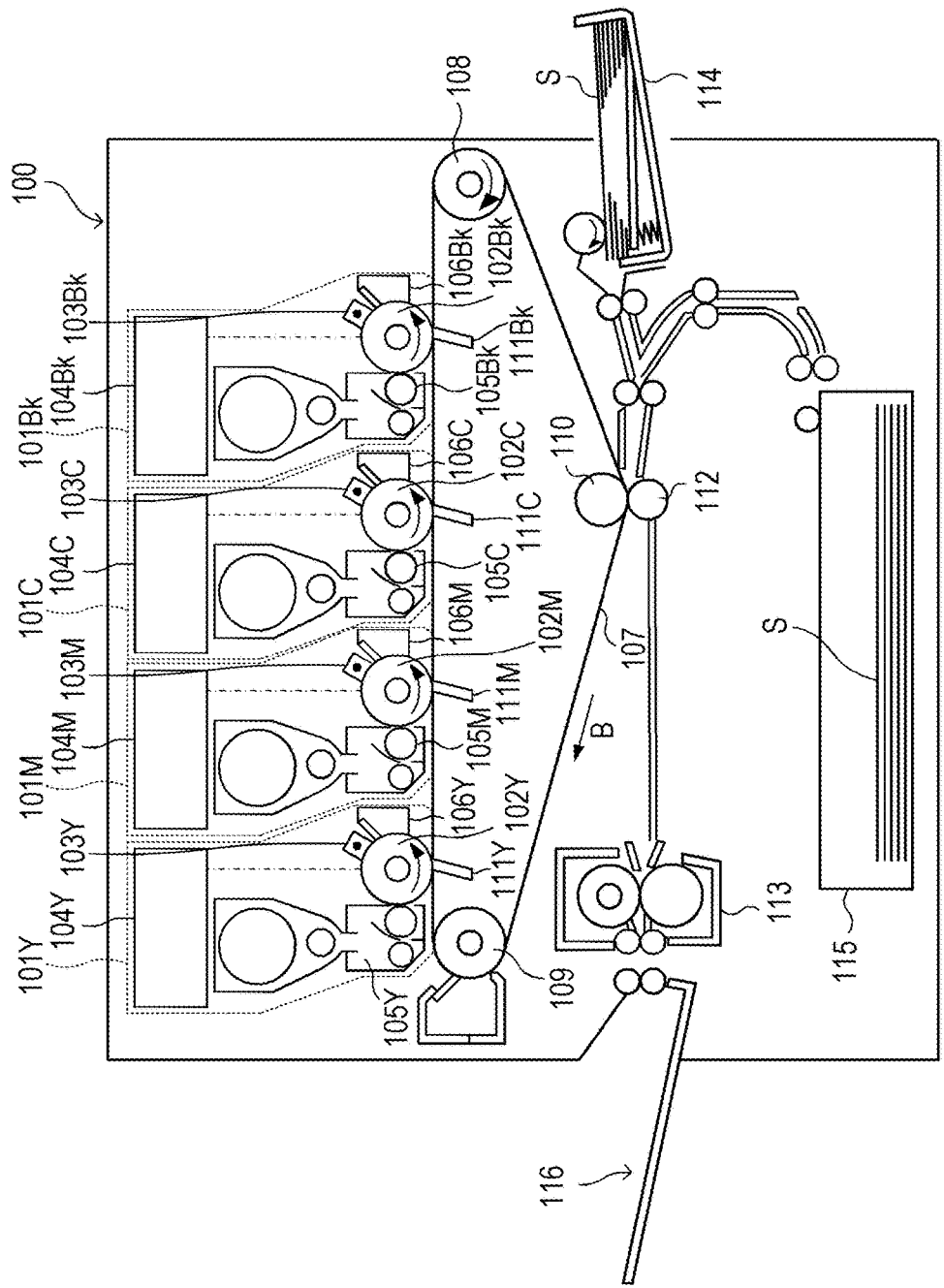
FIG. 1A is a view for illustrating an entire image forming apparatus according to first and second embodiments.

FIG. 1A is a schematic cross-sectional view of a digital full-color printer (color image forming apparatus) configured to perform image formation by using toners of a plurality of colors. An image forming apparatus 100 according to a first embodiment will be described with reference to FIG. 1A. The image forming apparatus 100 includes four image forming portions (image forming units) 101Y, 101M, 101C, and 101Bk (broken line portions) respectively configured to form images of different colors. The image forming portions 101Y, 101M, 101C, and 101Bk form images by using toners of yellow, magenta, cyan, and black, respectively. Reference symbols Y, M, C, and Bk denote yellow, magenta, cyan, and black, respectively, and suffixes Y, M, C, and Bk are omitted in the description below unless a particular color is described.

The image forming portions 101 each include a photosensitive drum 102, being a photosensitive member. A charging device 103, a light scanning device 104, and a developing device 105 are arranged around each of the photosensitive drums 102. A cleaning device 106 is further arranged around each of the photosensitive drums 102. An intermediate transfer belt 107 of an endless belt type is arranged under the photosensitive drums 102. The intermediate transfer belt 107 is stretched around a drive roller 108 and driven rollers 109 and 110, and rotates in a direction of an arrow B (clockwise direction) illustrated in FIG. 1A while forming an image. Further, primary transfer devices 111 are arranged at positions opposed to the photosensitive drums 102 across the intermediate transfer belt 107 (intermediate transfer member). The image forming apparatus 100 according to the embodiment further includes a secondary transfer device 112 configured to transfer the toner image on the intermediate transfer belt 107 onto a sheet S being a recording medium and a fixing device 113 configured to fix the toner image on the sheet S.

An image forming process from a charging step to a developing step of the image forming apparatus 100 will be described. The image forming process is the same in each of the image forming portions 101, and hence the image forming process will be described with reference to an example of the image forming portion 101Y. Accordingly, descriptions of the image forming processes in the image forming portions 101M, 101C, and 101Bk are omitted. The photosensitive drum 102Y which is driven to rotate in the arrow direction (counterclockwise direction) illustrated in FIG. 1A is charged by the charging device 103Y of the image forming portion 101Y. The charged photosensitive drum 102Y is exposed by a laser beam emitted from the light scanning device 104Y, which is indicated by the dashed dotted line. With this operation, an electrostatic latent image is formed on the rotating photosensitive drum 102Y (on the photosensitive member). The electrostatic latent image formed on the photosensitive drum 102Y is developed as a toner image of yellow by the developing device 105Y. The same step is performed also in the image forming portions 101M, 101C, and 101Bk.

The image forming process from a transfer step will be described. The primary transfer devices 111 applied with a transfer voltage transfer toner images of yellow, magenta, cyan, and black formed on the photosensitive drums 102 of the image forming portions 101 onto the intermediate transfer belt 107. With this, the toner images of respective colors are superimposed one on another on the intermediate transfer belt 107. That is, the toner images of four colors are transferred onto the intermediate transfer belt 107 (primary transfer). The toner images of four colors transferred onto the intermediate transfer belt 107 are transferred onto the sheet S conveyed from a manual feed cassette 114 or a sheet feed cassette 115 to a secondary transfer portion by the secondary transfer device 112 (secondary transfer). Then, the unfixed toner images on the sheet S are heated and fixed onto the sheet S by the fixing device 113, to thereby form a full-color image on the sheet S. The sheet S having the image formed thereon is delivered to a delivery portion 116.

<Photosensitive Drum and Light Scanning Device>

Figure 1B:
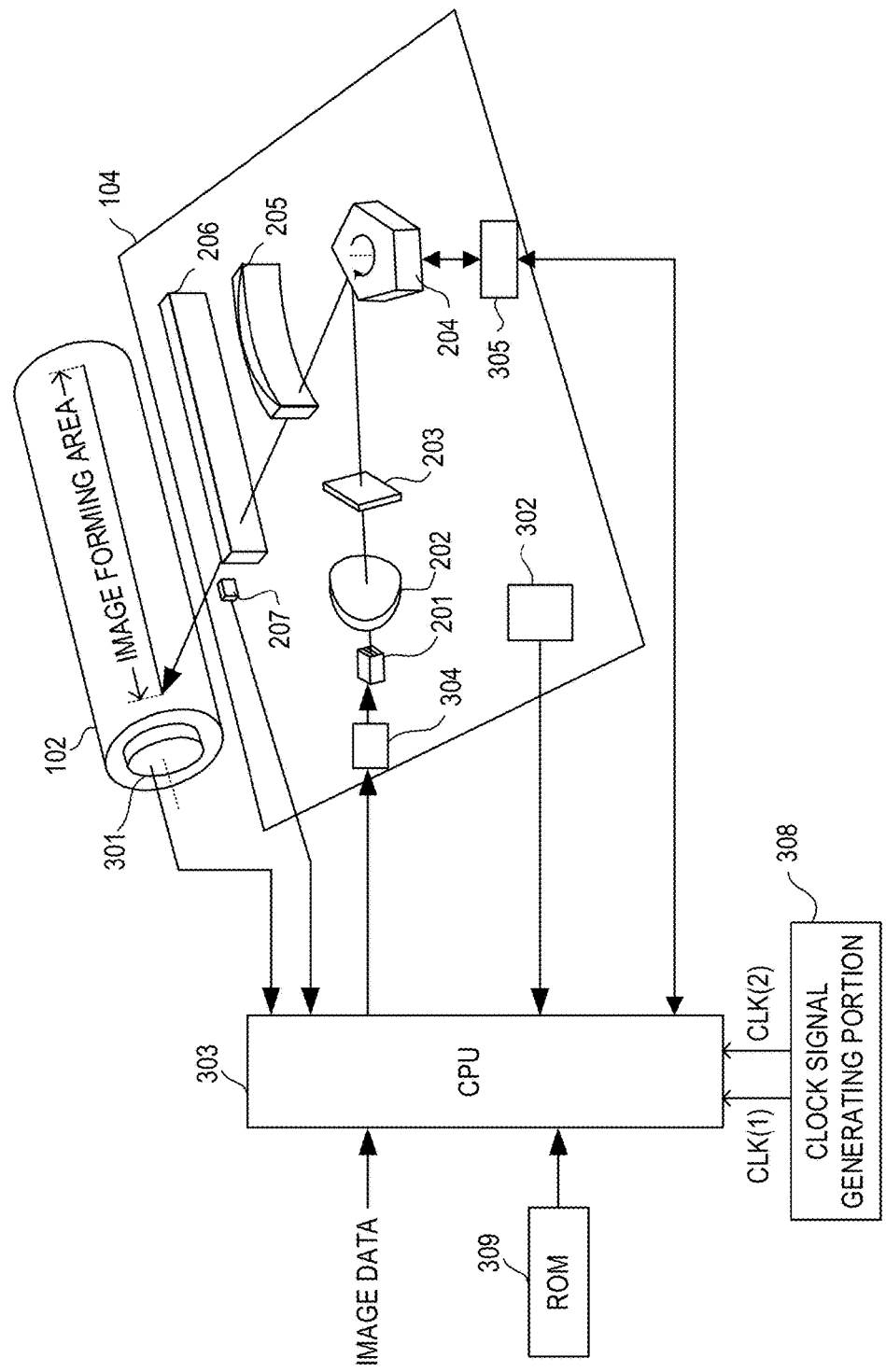
FIG. 1B is a view for illustrating a configuration of the periphery of a photosensitive drum and a light scanning device.

FIG. 1B is an illustration of configurations of the photosensitive drum 102, the light scanning device 104, and a controller for the light scanning device 104. The light scanning device 104 includes a laser light source 201, a collimator lens 202, a cylindrical lens 203, and a rotary polygon mirror 204. The laser light source 201 includes a plurality of light emitting points. The plurality of light emitting points are each configured to emit a laser beam (light beam). The collimator lens 202 is configured to collimate the laser beam. The cylindrical lens 203 condenses the laser beam having passed through the collimator lens 202 in a sub-scanning direction. In the embodiment, the laser light source 201 is described by exemplifying a light source in which a plurality of light emitting points are arranged, but is similarly operated also in the case of using a single light source. The laser light source 201 is driven by a laser drive circuit 304. The rotary polygon mirror 204 is formed of a motor portion configured to be operated to rotate and a reflection mirror mounted on a motor shaft. A face of the reflection mirror of the rotary polygon mirror 204 is hereinafter referred to as "mirror face". The rotary polygon mirror 204 is driven by a rotary polygon mirror drive portion 305. The light scanning device 104 includes fθ lenses 205 and 206 configured to receive a laser beam (scanning light) deflected by the rotary polygon mirror 204. Further, the light scanning device 104 includes a memory (storage unit) 302 configured to store various pieces of information.

Further, the light scanning device 104 includes a beam detector 207 (hereinafter referred to as "BD 207") that is a signal generating unit configured to detect the laser beam deflected by the rotary polygon mirror 204 and output a horizontal synchronization signal (hereinafter referred to as "BD signal") in accordance with the detection of the laser beam. The laser beam output from the light scanning device 104 scans the photosensitive drum 102. The scanning direction of the laser beam is substantially parallel to the rotary shaft of the photosensitive drum 102. Every time the mirror face of the rotary polygon mirror 204 scans the photosensitive drum 102, the light scanning device 104 causes a laser beam emitted from the laser light source to scan the photosensitive drum 102 in the main scanning direction, to thereby form scanning lines corresponding to the number of laser elements simultaneously. In the embodiment, a configuration is described in which the rotary polygon mirror 204 has five mirror faces, and the laser light source 201 includes eight laser elements, as an example. That is, in the embodiment, an image of eight lines is formed with one scanning, and the rotary polygon mirror 204 scans the photosensitive drum 102 five times per one revolution of the rotary polygon mirror 204, to thereby form an image of forty lines in total.

The photosensitive drum 102 includes a rotary encoder 301 on the rotary shaft, and the rotation speed of the photosensitive drum 102 is detected with the use of the rotary encoder 301. The rotary encoder 301 serving as a detection unit generates 1,000 pulses per one revolution of the photosensitive drum 102, and outputs information on the rotation speed (rotation speed data) of the photosensitive drum 102 based on the results obtained by measuring a time interval between the pulses generated with the use of a built-in timer to a CPU 303. A known speed detection technology other than the above-mentioned rotary encoder 301 may be used as long as the rotation speed of the photosensitive drum 102 can be detected. As a method other than the use of the rotary encoder 301, there is given, for example, a configuration to detect the surface speed of the photosensitive drum 102 with a laser Doppler.

Figure 2:
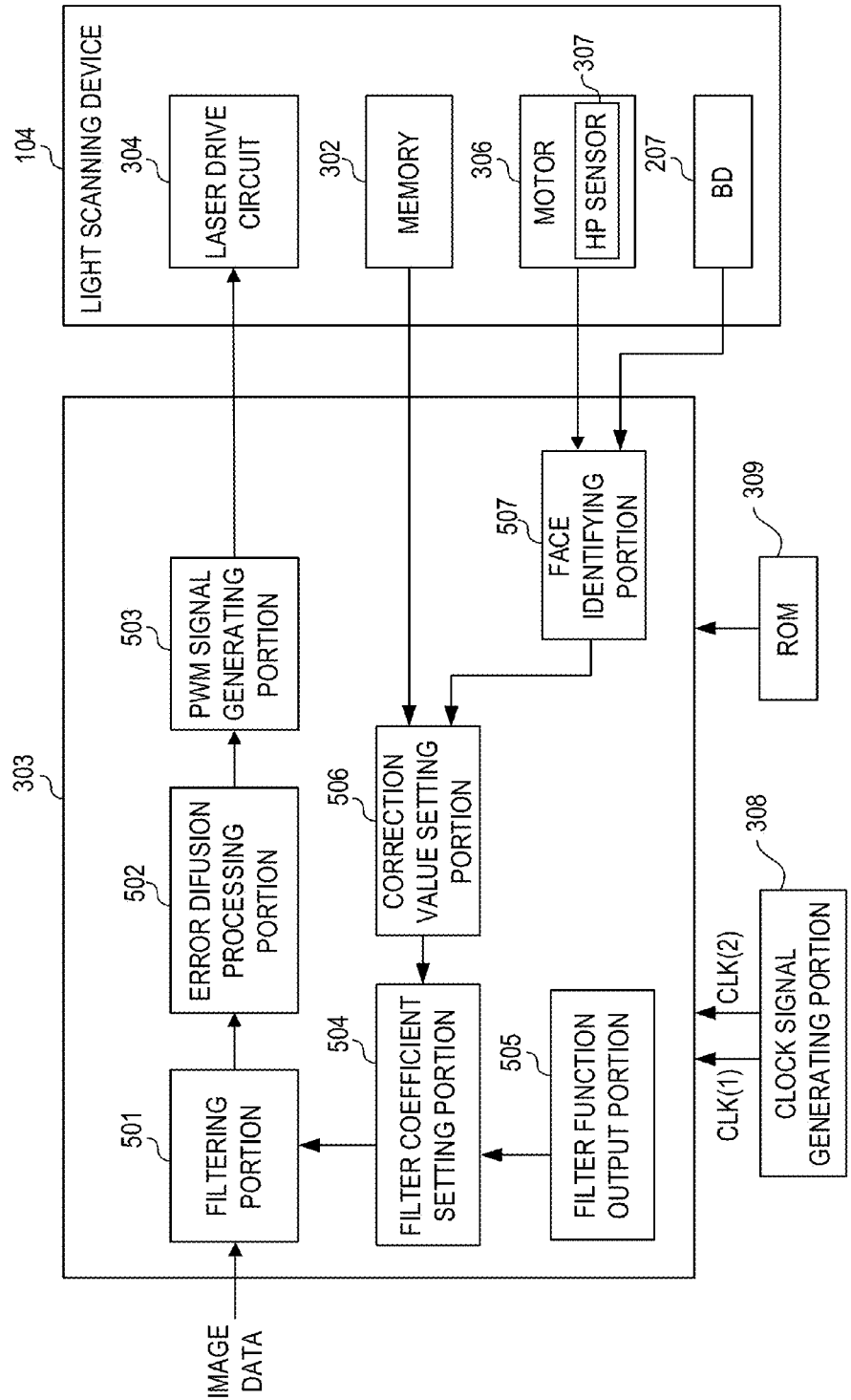
FIG. 2 is a block diagram of the image forming apparatus according to the first and second embodiments.

Next, the CPU 303 serving as the controller for the light scanning device 104 and a clock signal generating portion 308 will be described with reference to FIG. 2. The CPU 303 and the clock signal generating portion 308 are mounted on the image forming apparatus 100. FIG. 2 is a block diagram for illustrating the functions of the CPU 303 configured to execute correction processing of correcting distortion and uneven image density of an image described later. The CPU 303 includes a filtering portion 501, an error diffusion processing portion 502, and a pulse width modulation (PWM) signal generating portion 503. The filtering portion 501 is configured to perform filtering by subjecting input image data to a convolution operation. The error diffusion processing portion 502 is configured to subject the image data after the filtering to error diffusion processing. The PWM signal generating portion 503 is configured to subject the image data (density data) after the error diffusion processing to PWM transformation and output a PWM signal to the laser drive circuit 304 of the light scanning device 104. The clock signal generating portion 308 is configured to output a clock signal CLK(1) and a clock signal CLK(2) to the CPU 303. The clock signal CLK(1) is a clock signal illustrated in FIG. 5 described later. The clock signal CLK(1) is a signal generated by multiplying the clock signal CLK(2). Thus, the clock signal CLK(1) and the clock signal CLK(2) have a synchronization relationship. In the embodiment, the clock signal generating portion 308 outputs the clock signal CLK(1) generated by multiplying the clock signal CLK(2) by 16 to the CPU 303. The clock signal CLK(2) is a signal having a period corresponding to one pixel. The clock signal CLK(1) is a signal having a period corresponding to divided pixels obtained by dividing one pixel by 16.

Further, the CPU 303 includes a filter coefficient setting portion 504, a filter function output portion 505, and a correction value setting portion 506. The filter function output portion 505 is configured to output data on a function to be used for a convolution operation (for example, data in a table) to the filter coefficient setting portion 504. As a function to be used for the convolution operation, there is given, for example, linear interpolation and bicubic interpolation. The correction value setting portion 506 is configured to identify a mirror face which reflects a laser beam from among a plurality of mirror faces based on a face synchronization signal input from a face identifying portion 507. The correction value setting portion 506 is configured to determine a positional deviation amount in the rotation direction of the photosensitive drum 102 of a scanning line formed with a laser beam deflected by the mirror face identified by the face identifying portion 507 described later. The correction value setting portion 506 then calculates a correction value based on the positional deviation amount of the scanning line and outputs the calculated correction value to the filter coefficient setting portion 504. The filter coefficient setting portion 504 is configured to calculate a filter coefficient to be used for the filtering in the filtering portion 501 based on information on the convolution function input from the filter function output portion 505 and the correction value input from the correction value setting portion 506. The filter coefficient setting portion 504 is configured to set the calculated filter coefficient in the filtering portion 501. The correction value input to the filter coefficient setting portion 504 from the correction value setting portion 506 is a correction value set individually for each of the plurality of mirror faces.

Further, the CPU 303 includes the face identifying portion 507. The face identifying portion 507 is configured to identify a mirror face of the rotary polygon mirror 204 based on an HP signal input from a home position sensor (hereinafter referred to as "HP sensor") 307 of the light scanning device 104 and the BD signal input from the BD 207. The face identifying portion 507 is configured to output information of the identified mirror face to the correction value setting portion 506 as a face synchronization signal.

The CPU 303 is configured to receive image data from an image controller (not shown) configured to generate image data. The image data is gradation data indicating a density value. The gradation data is data of a plurality of bits indicating a density value for each pixel. For example, in the case of image data of 4 bits, a density value of one pixel is expressed by 16 gradations, and in the case of image data of 8 bits, a density value of one pixel is expressed by 256 gradations. In the embodiment, the image data input to the CPU 303 from the image controller is 4 bits per pixel. The filtering portion 501 is configured to subject the image data to filtering for each pixel in synchronization with the clock signal CLK(2). The CPU 303 is connected to the rotary encoder 301, the BD 207, the memory 302, the laser drive circuit 304, and the rotary polygon mirror drive portion (hereinafter referred to as "mirror drive portion") 305. The CPU 303 is configured to detect a write position of a scanning line based on the BD signal input from the BD 207 and count a time interval of the BD signal, to thereby detect the rotation speed of the rotary polygon mirror 204. Further, the CPU 303 is configured to output an acceleration or deceleration signal for designating acceleration or deceleration to the mirror drive portion 305 so that the rotary polygon mirror 204 reaches a predetermined speed. The mirror drive portion 305 is configured to supply a driving current to the motor portion of the rotary polygon mirror 204 in accordance with the acceleration or deceleration signal input from the CPU 303, to thereby drive a motor 306.

The HP sensor 307 is mounted on the rotary polygon mirror 204 and is configured to output the HP signal to the CPU 303 at timing at which the rotary polygon mirror 204 reaches a predetermined angle during a rotation operation. For example, the HP signal is generated once during every rotation of the rotary polygon mirror 204. The face identifying portion 507 resets an internal counter in response to the generation of the HP signal. Then, the face identifying portion 507 increments a count value of the internal counter by "1" every time the BD signal is input. That is, each count value of the internal counter is information indicating a corresponding one of the plurality of mirror faces of the rotary polygon mirror 204. The CPU 303 can identify which of the plurality of mirror faces the input image data corresponds to with the use of the count value. That is, the CPU 303 can switch a filter coefficient for correcting the input image data with the use of the count value.

The memory 302 is configured to store, for each mirror face, position information (first scanning position information) indicating positional deviation amounts from ideal scanning positions in the sub-scanning direction of a plurality of laser beams reflected by the mirror faces of the rotary polygon mirror 204. Further, the memory 302 is configured to store position information (second scanning position information) indicating a positional deviation amount from the ideal scanning position in the sub-scanning direction of the laser beam emitted from each light emitting point. The CPU 303 is configured to read each of the first scanning position information and the second scanning position information. The CPU 303 is configured to calculate the position of each scanning line based on the position information read from the memory 302 and calculate image data taking information for correcting the position of each scanning line into account from the calculated position of each scanning line and the input image data. The PWM signal generating portion 503 of the CPU 303 is configured to convert the image data taking the information for correcting the position of each scanning line into account into drive data. A ROM 309 is configured to store a conversion table for converting image data of 4 bits into drive data of 16 bits as shown in FIG. 22. A vertical axis of the conversion table shown in FIG. 22 represents image data indicating density values of 4 bits, which corresponds to one pixel. A horizontal axis of the conversion table shown in FIG. 22 represents drive data of bits associated with the density values of 4 bits individually. For example, in the case where image data input to the PWM signal generating portion 503 is a bit pattern of "0110", the PWM signal generating portion 503 converts the image data "0110" into drive data that is a bit pattern of "0000000001111111" with the use of the conversion table. The PWM signal generating portion 503 outputs the converted drive data in the order of "0000000001111111" serially on a bit basis in accordance with the clock signal (1) described later. When the PWM signal generating portion 503 outputs the drive data, a PWM signal is generated. When the PWM signal generating portion 503 outputs "1", a light emitting point emits a laser beam. When the PWM signal generating portion 503 outputs "0", a light emitting point does not output a laser beam.

<Scanning Position Information>

Figure 3:
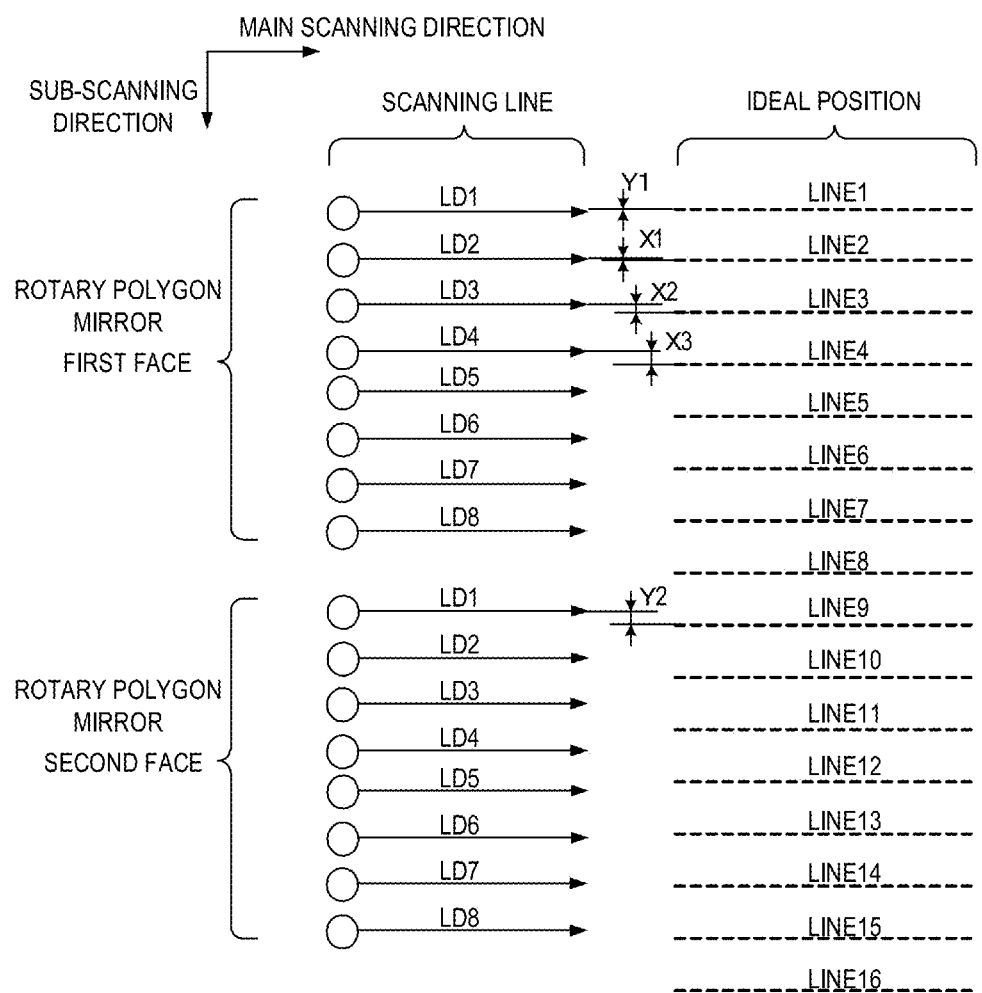
FIG. 3 is a diagram for illustrating positional deviation of scanning lines according to the first and second embodiments.

Next, scanning position information stored in the memory 302 will be described with reference to FIG. 3 and Table 1. FIG. 3 is an illustration of a state of positional deviation of each scanning line from an ideal position. Scanning lines scanned by each laser beam of the laser light source having eight light emitting points are denoted by LD1, LD2, LD3, LD4, LD5, LD6, LD7, and LD8. An ideal interval between the respective scanning lines is determined based on a resolution. For example, in the case of an image forming apparatus having a resolution of 1,200 dpi, an ideal interval between the respective scanning lines is 21.16 µm. When the scanning line LD1 is defined as a reference position, ideal distances D2 to D8 of the scanning lines LD2 to LD8 from the scanning line LD1 are calculated by Expression (1).

$$Dn=(n-1)\times 21.16\ \mu m\ (n=2\ to\ 8) \qquad \text{Expression (1)}$$

For example, the ideal distance D4 from the scanning line LD1 to the scanning line LD4 is 63.48 µm (=(4−1)×21.16 µm).

In this case, an interval between the scanning lines on the photosensitive drum 102 has an error due to an error of arrangement intervals of the plurality of light emitting points and characteristics of a lens. The positional deviation amounts of the scanning line positions of the scanning lines LD2 to LD8 with respect to ideal positions determined based on the ideal distances D2 to D8 are denoted by X1 to X7. Regarding the first face of the rotary polygon mirror 204, for example, the positional deviation amount X1 of the scanning line LD2 is defined as a difference between the ideal position of the scanning line LD2 (hereinafter referred to as "LINE 2", which similarly applies to the other scanning lines) and the actual scanning line. Further, for example, the positional deviation amount X3 of the scanning line LD4 is defined as a difference between the LINE 4 and the actual scanning line.

Due to a variation in manufacturing of each mirror face of the rotary polygon mirror 204, the mirror faces of the rotary polygon mirror 204 are not completely parallel to the rotary shaft, and the rotary polygon mirror 204 has an angle variation for each mirror face. The positional deviation amounts with respect to the ideal positions in each mirror face of the rotary polygon mirror 204 are denoted by Y1 to Y5 when the number of the mirror faces of the rotary polygon mirror 204 is five. In FIG. 3, a deviation amount of the scanning line LD1 from the ideal position (LINE 1) in the first face of the rotary polygon mirror 204 is denoted by Y1, and a deviation amount of the scanning line LD1 from the ideal position (LINE 9) in the second face of the rotary polygon mirror 204 is denoted by Y2.

A mirror face of the rotary polygon mirror 204 is defined as an m-th face, and a positional deviation amount of a scanning line (LDn) by an n-th laser beam from the laser light source is denoted by Zmn. Then, the positional deviation amount Zmn is represented by Expression (2) with the use of the positional deviation amounts X1 to X7 of each scanning line and the positional deviation amounts Y1 to Y5 of each mirror face.

$$Zmn=Ym+X(n-1)\ (m=1\ to\ 5,\ n=1\ to\ 8) \qquad \text{Expression (2)}$$

(Where X(0)=0.)

For example, a positional deviation amount Z14 regarding the scanning line LD4 in the first face of the rotary polygon mirror 204 is determined to be Z14=Y1+X3 by Expression (2). Further, a positional deviation amount Z21 regarding the scanning line LD1 in the second face of the rotary polygon mirror 204 is determined to be Z21=Y2 by Expression (2).

When the positional deviation amount Zmn is calculated by Expression (2), it is only necessary that the number of pieces of data to be used for calculating the positional deviation amount Zmn correspond to the number of the mirror faces of the rotary polygon mirror 204 and the number of light emitting points of the laser light source. An address map of positional deviation data stored in the memory 302 is shown in Table 1.

TABLE 1

| Address | Data |
|---|---|
| 0 | LD2 Position Information X1 |
| 1 | LD3 Position Information X2 |
| 2 | LD4 Position Information X3 |

TABLE 1-continued

| Address | Data |
|---|---|
| 3 | LD5 Position Information X4 |
| 4 | LD6 Position Information X5 |
| 5 | LD7 Position Information X6 |
| 6 | LD8 Position Information X7 |
| 7 | First Face Position Information Y1 |
| 8 | Second Face Position Information Y2 |
| 9 | Third Face Position Information Y3 |
| 10 | Fourth Face Position Information Y4 |
| 11 | Fifth Face Position Information Y5 |

As shown in Table 1, information on the respective positional deviation amounts (described as position information) X1 to X7 of the scanning line LD2 to the scanning line LD8 is stored in from an address 0 to an address 6 of the memory 302. Further, information on the respective positional deviation amounts Y1 to Y5 of the first face to the fifth face of the mirror faces of the rotary polygon mirror 204 is stored in from an address 7 to an address 11 of the memory 302. In the embodiment, description is given on the assumption that the eight scanning lines of each laser beam are deviated uniformly due to the positional deviation of each mirror face of the rotary polygon mirror 204. That is, in the embodiment, twelve pieces of position information are stored in the memory 302. However, when there is a variation in positional deviation amount of each scanning line of a laser beam for each mirror face of the rotary polygon mirror 204, there may be stored information on a positional deviation amount only for a combination of each mirror face of the rotary polygon mirror 204 and each scanning line of the laser beam. That is, in this case, forty pieces of position information are stored in the memory 302 with the number of the mirror faces of the rotary polygon mirror 204 being five, and the number of light emitting points of the laser light source being eight.

(Memory Storage Operation)

As information on a positional deviation amount to be stored in the memory 302, for example, data measured in an adjustment step of the light scanning device 104 in a factory or the like is stored. Further, the image forming apparatus 100 may include a position detection unit configured to detect the position of a scanning line scanned with a laser beam emitted from the laser light source 201 so that the information stored in the memory 302 may be updated in real time. As the position detection unit configured to detect a position of scanning light in the sub-scanning direction, a known technology may be used. For example, a position may be detected by a CMOS sensor or a position sensitive detector (PSD) arranged in the light scanning device 104 or arranged on a scanning path of a laser beam near the photosensitive drum 102. Further, a triangular slit may be formed in a surface of a photo diode (PD) arranged in the light scanning device 104 or arranged near the photosensitive drum 102, to thereby detect a position from an output pulse width of the PD.

Figure 4:
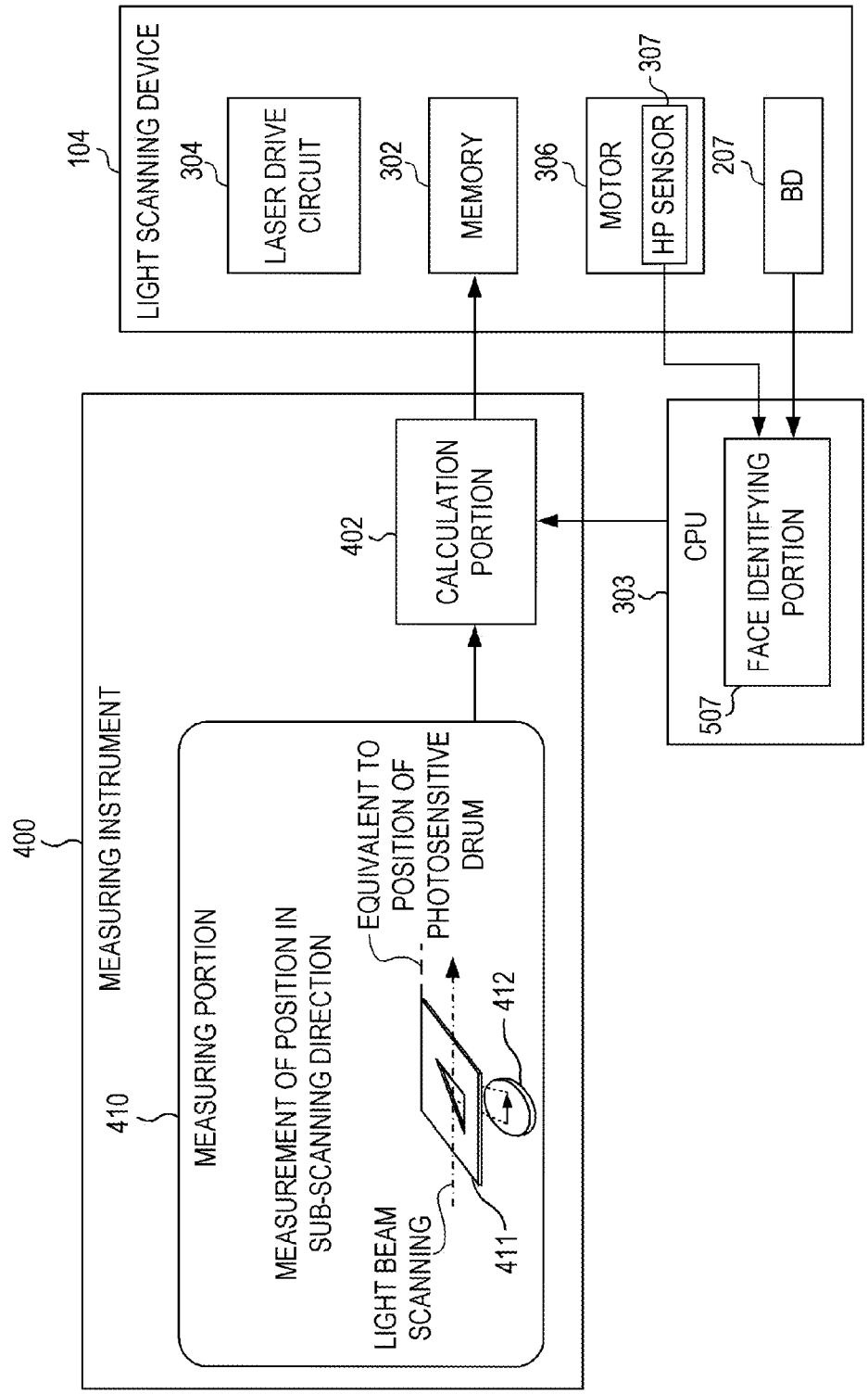
FIG. 4 is a block diagram for illustrating a step of storing information in a memory according to the first and second embodiments.

FIG. 4 is a block diagram for illustrating a step of storing information in the memory 302 of the light scanning device 104 in a factory or the like as an example. The same configurations as those of FIG. 2 are denoted by the same reference symbols as those therein, and the description thereof is omitted. In the adjustment step for the light scanning device 104, a measuring instrument 400 is arranged at a position corresponding to the scanning position on the photosensitive drum 102 when the light scanning device 104 is mounted on the image forming apparatus 100.

The measuring instrument 400 includes a measuring portion 410 and a calculation portion 402, and the calculation portion 402 is configured to receive a face synchronization signal from the face identifying portion 507 of the CPU 303 of FIG. 2. In the CPU 303 of FIG. 4, only the face identifying portion 507 is illustrated. First, a laser beam is radiated to the measuring portion 410 from the light scanning device 104. The measuring portion 410 includes a triangular slit 411 and a PD 412. A laser beam emitted from the light scanning device 104 indicated by the arrow with the alternate long and short dash line in FIG. 4 scans the triangular slit 411. The measuring portion 410 measures the position in the sub-scanning direction of a scanning line based on information on the laser beam input to the PD 412 through the triangular slit 411. The measuring portion 410 outputs information on the measured position in the sub-scanning direction of the scanning line in each mirror face (hereinafter referred to as "data for each face") of the rotary polygon mirror 204 to the calculation portion 402.

Meanwhile, the face identifying portion 507 is configured to receive the HP signal from the HP sensor 307 of the light scanning device 104 and receive the BD signal from the BD 207. With this, the face identifying portion 507 is configured to identify a mirror face of the rotary polygon mirror 204 and output information on the identified mirror face to the calculation portion 402 as a face synchronization signal. The calculation portion 402 is configured to write the information on the position in the sub-scanning direction of the scanning line measured by the measuring portion 410 into an address on the memory 302 of the light scanning device 104 in accordance with the information on the mirror face of the rotary polygon mirror 204 input from the face identifying portion 507. Thus, the information on the positional deviation amounts of the scanning lines caused by a variation in intervals between the eight light emitting points of the laser light source 201 (X1 to X7) and the information on the positional deviation amounts of the scanning lines caused by an optical face tangle error of the mirror face of the rotary polygon mirror 204 (Y1 to Y5) are stored in the memory 302.

<Calculation Method for Positional Deviation Amount>

Figure 5:
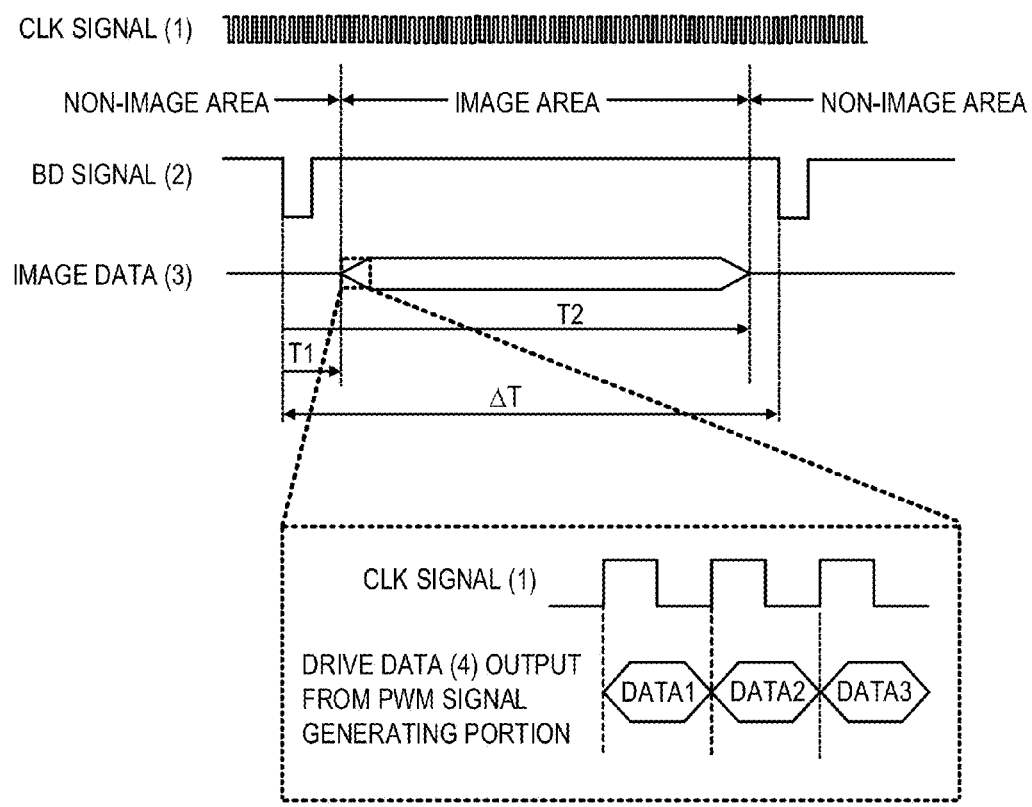
FIG. 5 is a time chart for illustrating one scanning period according to the first and second embodiments.

FIG. 5 is an illustration of control timing in one scanning period of a laser beam in the embodiment. (1) represents a CLK signal corresponding to a pixel period per divided pixel (1/16 pixel) obtained by dividing one pixel by 16, and (2) represents input timing of the BD signal from the BD 207 to the CPU 303. (3) and (4) are each an illustration of timing at which the CPU 303 outputs drive data (DATA1, DATA2, etc.). Image data of (4) represents drive data after the filtering.

With the BD signal output from the BD 207 being a reference, during a period of time from timing at which the BD signal is input to the CPU 303 to timing at which a subsequent BD signal is input to the CPU 303, a period of time from timing at which the BD signal is input to the CPU 303 to timing at which the processing of the image data input to the CPU 303 is started is defined as T1. Further, during the period of time from timing at which the BD signal is input to the CPU 303 to timing at which a subsequent BD signal is input to the CPU 303, a period of time from timing at which the BD signal is input to the CPU 303 to timing at which the output of the image data input to the CPU 303 is completed is defined as 12. After the BD signal is input to the CPU 303, the CPU 303 stands by until the predetermined period of time T1 elapses. Then, the CPU 303 starts the filtering of the input image data in synchronization with the clock signal CLK(2) to generate drive data successively from the processed image data and output the drive data on a bit basis, to thereby output the PWM signal to the laser drive circuit 304. Then, after the predetermined period of time T2 elapses from the input of the BD signal, the CPU 303 finishes the processing of the image data in one scanning line. The CPU 303 calculates, for each scanning, a positional deviation amount of the scanning line in the scanning period until the predetermined period of time T1 elapses from the detection of the BD signal, that is, while the laser beam scans a non-image area. Then, the CPU 303 causes the filter coefficient setting portion 594 to set a filter coefficient based on the calculated positional deviation amount. Then, the CPU 303 causes, for each scanning, the filtering portion 501 to correct the image data with the use of the filter coefficient set by the filter coefficient setting portion 504 until the predetermined period of time T2 elapses from the elapse of the predetermined period of time T1.

In the embodiment, the CPU 303 uses a filter, which is set based on the positional deviation amount calculated for each scanning line, to perform the filter operation for the image data of a plurality of scanning lines. Therefore, in the above-mentioned positional deviation amount calculation operation, the CPU 303 is configured to determine positional deviation amounts of a plurality of scanning lines to be used in the filter operation during a period in which the period of time T1 elapses from the output of the BD signal from the BD 207. For example, when the range of the filter operation is defined as L=3, image data on three pixels upward and downward from a line of interest is referred to, and a positional deviation amount of each scanning line within the range of the three pixels upward and downward from the line of interest is calculated, to thereby perform the filter operation.

In this case, the positional deviation amount of the scanning line corresponding to the line of interest is calculated during a period immediately before image formation. Further, the calculation results of the positional deviation amounts calculated before are used for the scanning lines scanned before the scanning line of interest. For a scanning line to be scanned at timing after the scanning line of interest, a positional deviation amount B described later is determined based on the face information of the rotary polygon mirror 204 corresponding to the next scanning line and the beam position information. Further, a rotation speed Vp of the rotary polygon mirror 204 and a rotation speed Vd of the photosensitive drum 102 are determined by predicting each speed in a next scanning line based on a value detected at previous scanning timing and a value detected at current scanning timing. The details of the calculation method for a positional deviation amount will be described later.

(First Correction of Image Data)

Figure 6:
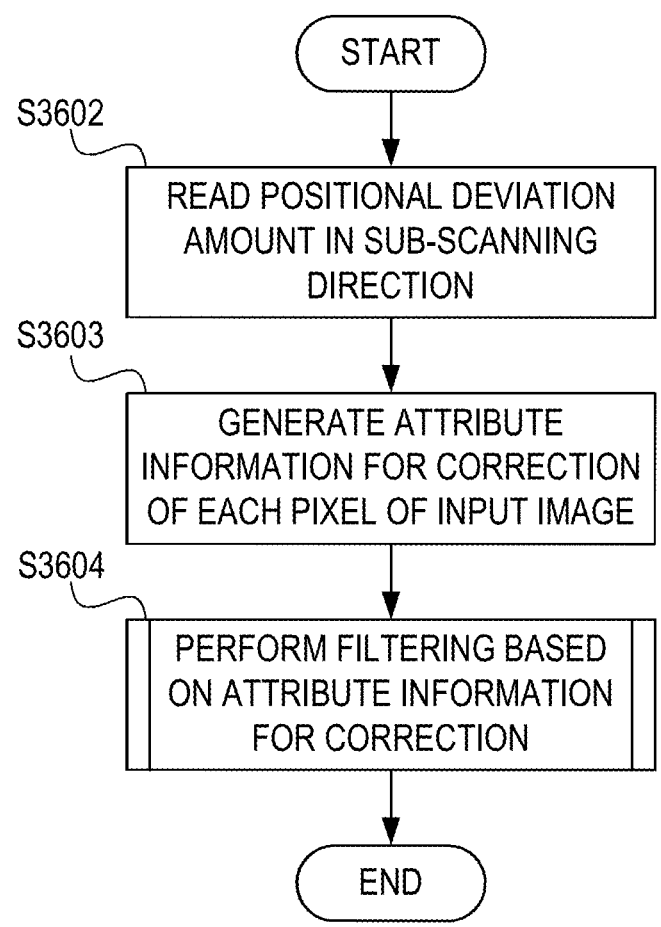
FIG. 6 is a flowchart for illustrating correction processing according to the first and second embodiments.

In the embodiment, the CPU 303 is configured to correct image data through filter operation based on the positional deviation amounts in the sub-scanning direction of the scanning lines formed by laser beams and output the corrected image data to the laser drive circuit 304. The filter operation, which is first correction processing, specifically is a calculation of performing convolution processing. In the embodiment, the convolution processing is performed based on the image data and the positional deviation amount. Now, a flowchart of FIG. 6 will be described below. FIG. 6 is a flowchart for illustrating the filter operation for correcting uneven image density and banding caused by the positional deviation in the sub-scanning direction. In Step S3602, the CPU 303 reads the positional deviation amount in the sub-scanning direction stored in the memory 302. Specifically, the CPU 303 reads the position information X1 to X7 of the scanning lines LD2 to LD 8 and the position information Y1 to Y5 of the first to fifth faces of the rotary polygon mirror 204 shown in Table 1 from the memory 302. In the embodiment, the pixel position in the sub-scanning direction of the input image data is corrected based on the positional deviation amount in the sub-scanning direction, followed by the filtering, to thereby output pixel data, that is, density. Convolution processing according to the embodiment involves correcting sparseness and denseness of density in the sub-scanning direction caused by deviation of a scanning line in the sub-scanning direction by moving a pixel of interest in the sub-scanning direction in accordance with the deviation of the scanning line. Further, the convolution processing involves correcting the sparseness and denseness of density by causing a pixel value of the pixel of interest to be output or not to be output depending on the movement in the sub-scanning direction.

(State of Positional Deviation of Scanning Line)

The state of positional deviation of a scanning line can be roughly classified into four cases. First, regarding the state of positional deviation, there is a case (a) in which the position of a scanning line (hereinafter referred to as "scanning position") on the photosensitive drum 102 is shifted in an advance direction with respect to an ideal scanning position, and a case (b) in which the scanning position on the photosensitive drum 102 is shifted in a return direction with respect to the ideal scanning position. Further, regarding the state of positional deviation, there is a case (c) in which the scanning positions on the photosensitive drum 102 are dense with respect to the ideal scanning positions, and a case (d) in which the scanning positions on the photosensitive drum 102 are sparse with respect to the ideal scanning positions. Specific examples of the state of positional deviation in the sub-scanning direction are illustrated in FIG. 7A, FIG. 7B, FIG. 7C, and FIG. 7D. In FIG. 7A to FIG. 7D, the broken lines represent scanning positions, and in FIG. 7A to FIG. 7D, (1) to (5) represent the order of scanning. In the embodiment, eight beams are used for scanning simultaneously, but description is given on the assumption that the order is allocated to each beam arranged successively in the sub-scanning direction. Each column on the left side of FIG. 7A to FIG. 7D represents ideal scanning positions, and each column on the right side represents scanning positions on the photosensitive drum 102. S1 to S5 represent positional deviation amounts from the ideal scanning positions with respect to scanning numbers (1) to (5). The unit of a positional deviation amount is represented based on the case where the ideal beam interval (21.16 µm at 1,200 dpi) is defined as 1, and the advance direction of a laser beam in the sub-scanning direction (hereinafter simply referred to as "advance direction") is set to a positive value. Further, the return direction of the laser beam in the sub-scanning direction (hereinafter simply referred to as "return direction") is set to a negative value. Further, in order to describe the state of an image, each pixel arranged in the sub-scanning direction is represented by a circle on the scanning line. The shading of the circle represents density.

Figure 7A:
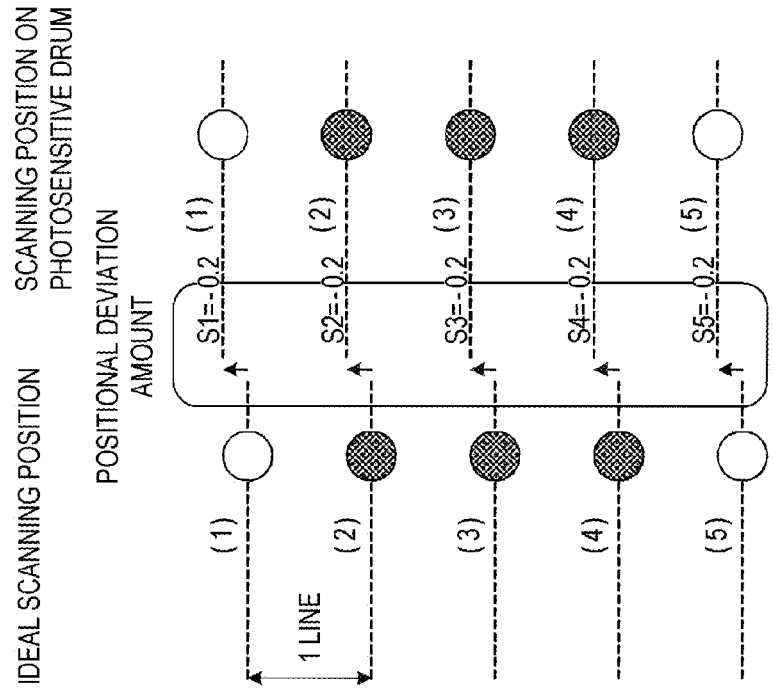
FIG. 7A, FIG. 7B, FIG. 7C, and FIG. 7D are each a diagram for illustrating positional deviation of pixels for each classification according to the first and second embodiments.
Figure 7B:
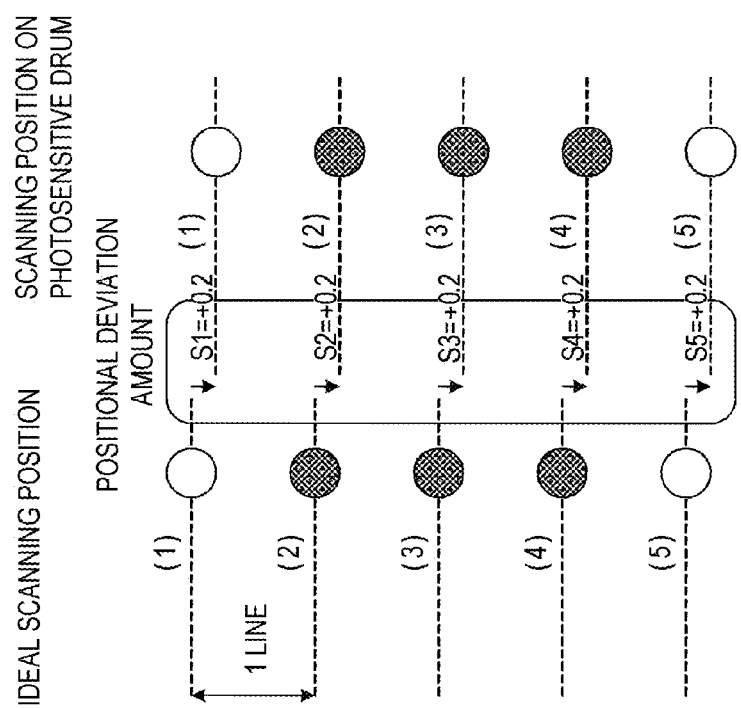

FIG. 7A is an illustration of an example in which the scanning positions on the photosensitive drum 102 are shifted by 0.2 uniformly in the advance direction from the ideal scanning positions. The positional deviation amount as illustrated in FIG. 7A is hereinafter referred to as a shift amount of +0.2. FIG. 7B is an illustration of an example in which the scanning positions on the photosensitive drum 102 are shifted by 0.2 uniformly in the return direction from the ideal scanning positions. The positional deviation amount as illustrated in FIG. 7B is hereinafter referred to as a shift amount of −0.2 line. In FIG. 7A and FIG. 7B, the scanning positions are shifted uniformly, and hence the interval between the scanning positions on the photosensitive drum 102 is 1 in both the cases.

Figure 7C:
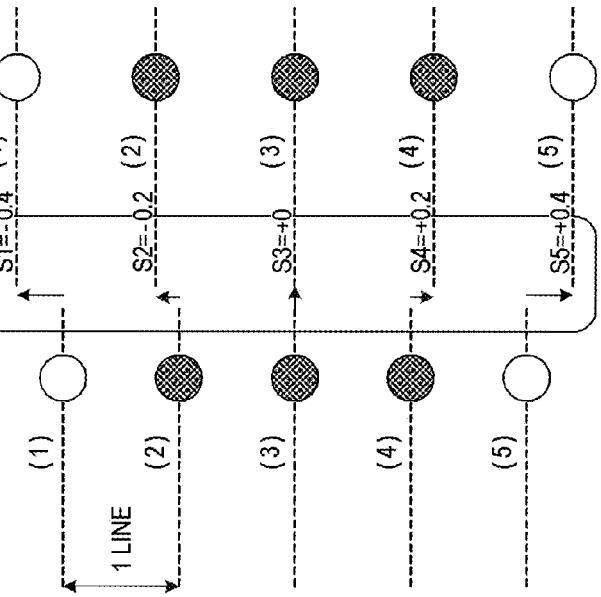

In FIG. 7C, the positional deviation amount is 0 at a predetermined scanning position on the photosensitive drum 102. However, as the scanning position returns backward from the scanning position of the positional deviation amount of 0, the positional deviation amount in the advance direction increases, and as the scanning position proceeds forward from the scanning position of the positional deviation amount of 0, the positional deviation amount in the return direction increases. For example, S3 is +0 in the scanning number (3), but S2 is +0.2 in the scanning number (2), S1 is +0.4 in the scanning number (1), S4 is −0.2 in the scanning number (4), and S5 is −0.4 in the scanning number (5). In FIG. 7C, the interval between the scanning positions is 0.8, which is smaller than 1. The state of positional deviation as illustrated in FIG. 7C is hereinafter referred to as being dense at an interval of a (1−0.2) line.

Figure 7D:
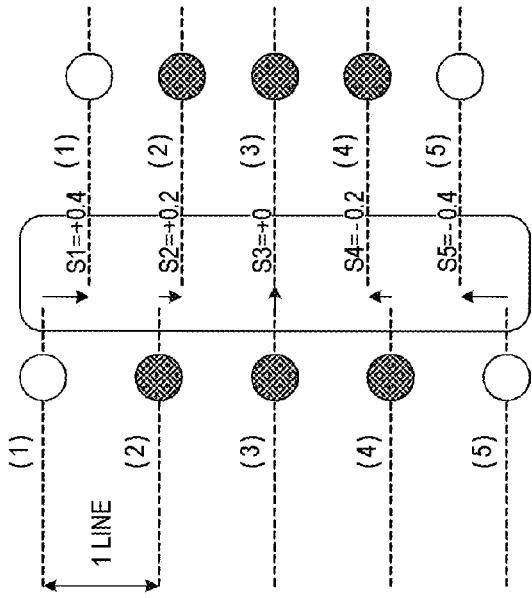

In FIG. 7D, the positional deviation amount is 0 at a predetermined scanning position on the photosensitive drum 102. However, as the scanning position returns backward from the scanning position of the positional deviation amount of 0, the positional deviation amount in the return direction increases, and as the scanning position proceeds forward from the scanning position of the positional deviation amount of 0, the positional deviation amount in the advance direction increases. For example, S3 is +0 in the scanning number (3), but S2 is −0.2 in the scanning number (2), S1 is −0.4 in the scanning number (1), S4 is +0.2 in the scanning number (4), and S5 is +0.4 in the scanning number (5). In FIG. 7D, the interval between the scanning positions is 1.2, which is larger than 1. The state of positional deviation as illustrated in FIG. 7D is hereinafter referred to as being sparse at an interval of a (1+0.2) line.

In the dense state as illustrated in FIG. 7C, positional deviation occurs, and in addition, the scanning positions are dense to cause pixels to be arranged densely on the photosensitive drum 102, with the result that a pixel value per predetermined area increases, to thereby increase density. In contrast, in the sparse state as illustrated in FIG. 7D, positional deviation occurs, and in addition, the scanning positions are sparse to cause pixels to be arranged sparsely on the photosensitive drum 102, with the result that a pixel value per predetermined area decreases, to thereby decrease density. In an electrophotographic process, a shading difference may be further emphasized due to a relationship between the depth of a latent image potential and development characteristics. Further, when the dense or sparse state occurs alternately as illustrated in FIG. 7C and FIG. 7D, a periodic shading causes moire, which is liable to be detected visually even at the same amount depending on a space frequency.

Referring back to the flowchart of FIG. 6, in Step S3603, the CPU 303 generates attribute information for correction of each pixel of an input image with the correction value setting portion 506. In the embodiment, the pixel position in the sub-scanning direction of an input image is subjected to coordinate transformation in advance and interpolated, thereby being capable of correcting positional deviation and correcting local shading simultaneously while maintaining density of the input image. The attribute information for correction specifically refers to a correction value C described later.

(Coordinate Transformation)

A method for coordinate transformation according to the embodiment will be described with reference to FIG. 8A, FIG. 8B, FIG. 9A, FIG. 9B, FIG. 9C, FIG. 9D, FIG. 10A, and FIG. 10B. In each graph of FIG. 8A to FIG. 10B, a horizontal axis represents a pixel number "n", and a vertical axis represents a pixel position (which is also a scanning position) "y" (y' after the coordinate transformation) in the sub-scanning direction, with the unit being a line. Further, FIG. 8A and FIG. 8B correspond to FIG. 7A and FIG. 7B, respectively. FIG. 10A and FIG. 10B correspond to FIG. 7C and FIG. 7D, respectively. Each graph on the left side of FIG. 8A, FIG. 8B, FIG. 10A, and FIG. 10B represents the state before the coordinate transformation, and each graph on the right side thereof represents the state after the coordinate transformation for the y-axis. Square dots plotted in each graph represent scanning positions on the photosensitive drum 102, and circular dots therein represent ideal scanning positions.

(Case of being shifted in Advance Direction and Return Direction)

Figure 8A:
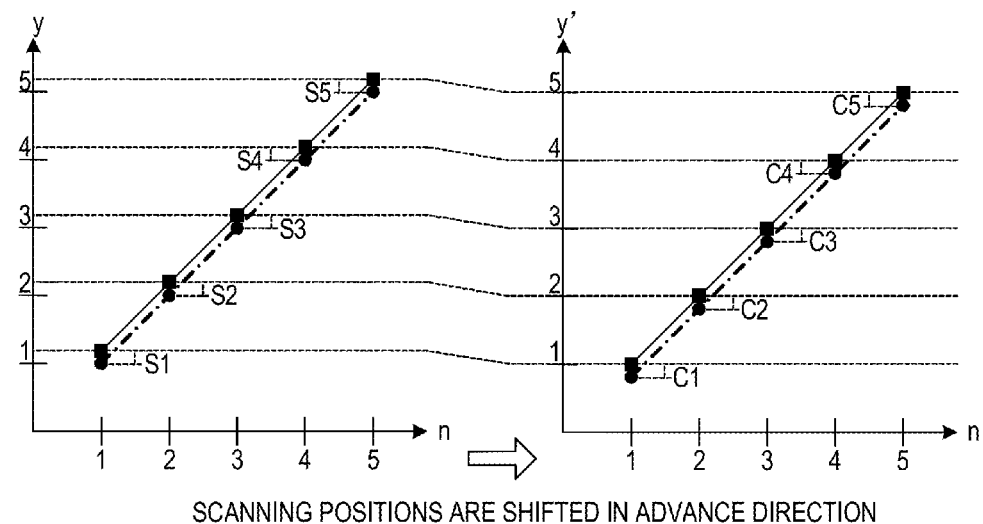
FIG. 8A and FIG. 8B are each a graph for showing coordinate transformation of pixel positions in a sub-scanning direction according to the first and second embodiments.
Figure 9A:
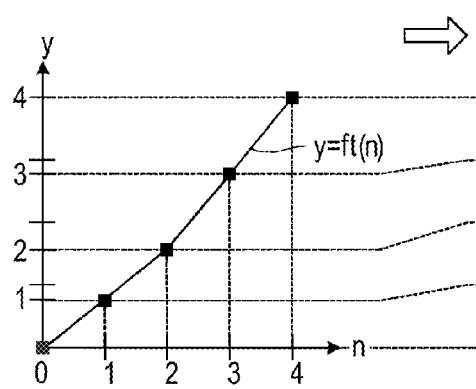
FIG. 9A, FIG. 9B, FIG. 9C, and FIG. 9D are each a graph for showing coordinate transformation of pixel positions in the sub-scanning direction according to the first and second embodiments.

The graph on the left side of FIG. 8A is first described. In the graph before the coordinate transformation, at the ideal scanning positions plotted with the circular dots, for example, a pixel position "y" in the sub-scanning direction is 2 with respect to the pixel number 2. Thus, the y-coordinate of the pixel position "y" is equal to that of the pixel number "n", and the ideal scanning positions are represented by a straight line (indicated by the alternate long and short dash line) with a gradient of 1. The straight line of the alternate long and short dash line is represented by Expression (3).

$$y=n \quad \text{Expression (3)}$$

As illustrated in FIG. 7A, the scanning positions plotted with the square dots are shifted by S (=0.2) line in the advance direction (+ direction of y-axis) with respect to the ideal scanning positions plotted with the circular dots. Therefore, the scanning positions plotted with the square dots are represented by a straight line (indicated by the solid line) offset with the gradient being 1, which is represented by Expression (4).

$$y=n+S \quad \text{Expression (4)}$$

In the embodiment, the coordinate transformation is performed so that the actual scanning positions are transformed into the ideal scanning positions. Therefore, in the example illustrated in FIG. 8A, it is only necessary that the coordinate transformation be performed with the use of Expression (5). In Expression (5), C represents a correction amount.

$$y'=y+C \quad \text{Expression (5)}$$

Thus, the correction amount C is represented by a shift amount S and Expression (6).

$$C=-S \quad \text{Expression (6)}$$

Through Expression (5) of the coordinate transformation and Expression (6) for determining the correction amount C, Expressions (3) and (4) are converted as represented by Expressions (7) and (8), respectively.

$$y'=y+C=n+(-S)=n-S \quad \text{Expression (7)}$$

$$y'=y+C=(n+S)+C=(n+S)+(-S)=n \quad \text{Expression (8)}$$

Figure 8B:
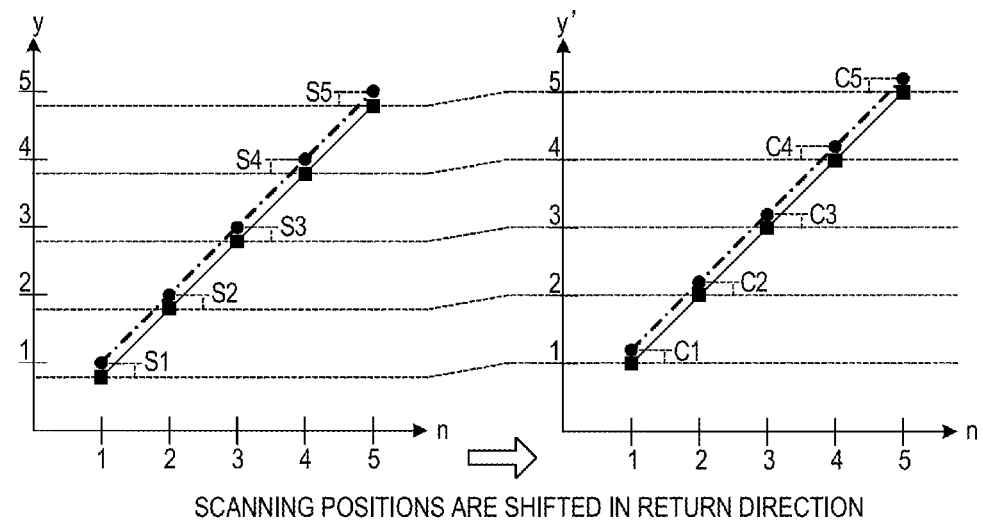

In FIG. 8B, when the shift amount S is defined as −0.2, Expression (8) similarly holds from Expression (3), and similar description to that of FIG. 8A can be given. As illustrated in FIG. 8A and FIG. 8B, when the scanning lines are not sparse or dense, and are shifted in the advance direction or the return direction, a straight line has a predetermined gradient before and after the coordinate transformation.

(Case in which Dense or Sparse State Occurs)

Now, the coordinate transformation will be described, which is also applicable to the cases in FIG. 10A and FIG. 10B in which the scanning positions become dense or sparse, and the cases of combinations of FIG. 8A, FIG. 8B, FIG. 10A, and FIG. 10B in which a shift and a dense or sparse state occur. FIG. 9A is an illustration of a relationship between the pixel number and the scanning position, and a horizontal axis represents a pixel number "n", and a vertical axis "y" represents a scanning position in the sub-scanning direction, square dots being plotted as the scanning positions on the photosensitive drum 102. In FIG. 9A, the case is described in which the scanning lines are dense on the photosensitive drum 102 within a range of the pixel number of n≤2, and the scanning lines are sparse on the photosensitive drum 102 within a range of the pixel number of n≥2.

As illustrated in FIG. 9A, when the scanning lines are dense within the range of the pixel number of n≤2, and are sparse within the range of the pixel number of n≥2, the gradient of a straight line within the range of the pixel number of n≤2 is different from that of a straight line within the range of the pixel number of n≥2, and the straight line has a curved shape at the pixel number of n=2. In FIG. 9A, a function indicating a change in scanning positions passing through the square dots is defined as ft(n) and is represented by the solid line. The function ft(n) representing the scanning positions is represented by Expression (9).

$$y=ft(n) \qquad \text{Expression (9)}$$

Next, when a function after the coordinate transformation of the y-axis that represents the scanning positions in the sub-scanning direction is defined as ft'(n), the function ft'(n) representing the scanning positions after the coordinate transformation is represented by Expression (10).

$$y'=ft'(n) \qquad \text{Expression (10)}$$

In the embodiment, the coordinate transformation is performed by expanding or contracting the y-axis or shifting the y-axis so that the scanning positions after the coordinate transformation become uniform. Therefore, the function ft'(n) representing the scanning positions after the coordinate transformation satisfies the condition represented by Expression (11).

$$ft'(n)=n \qquad \text{Expression (11)}$$

Expression (11) means that, for example, a pixel position y' (=ft'(2)) in the sub-scanning direction after the coordinate transformation becomes 2 with respect to the pixel number 2.

Figure 9B:
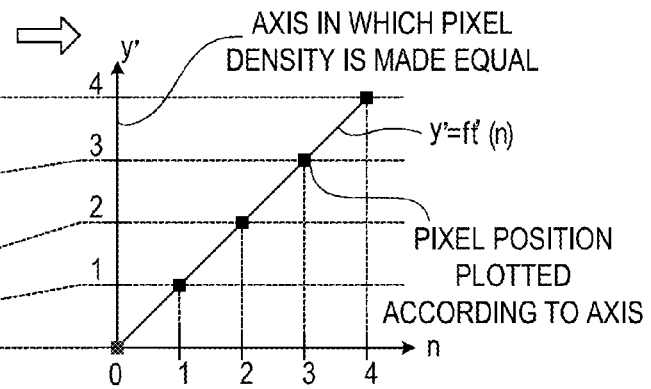
Figure 9C:
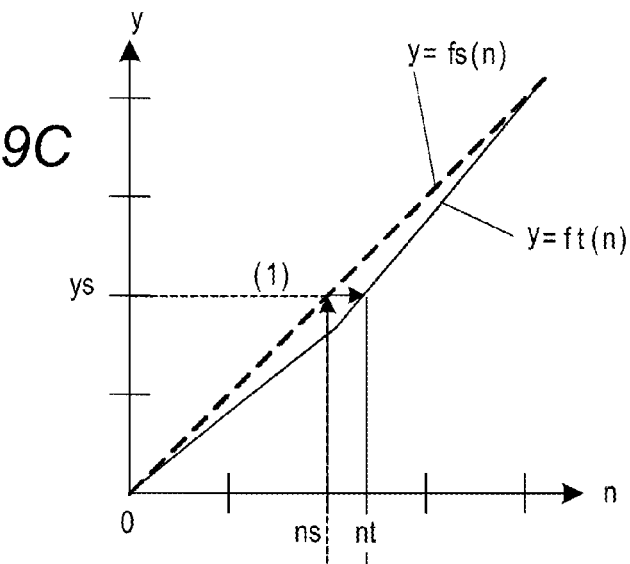
Figure 9D:
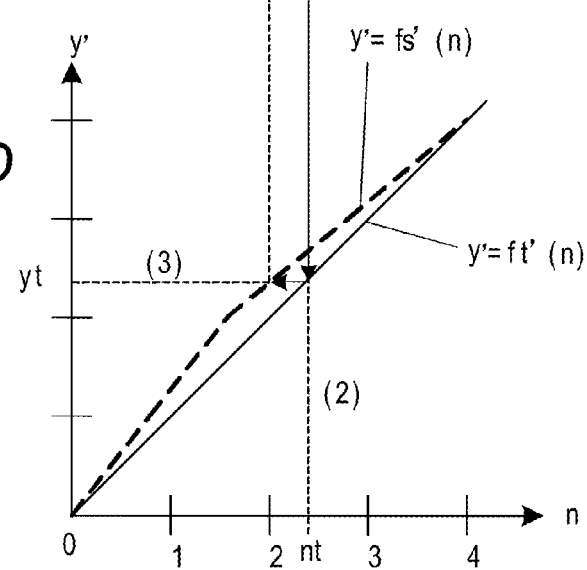
Figure 10A:
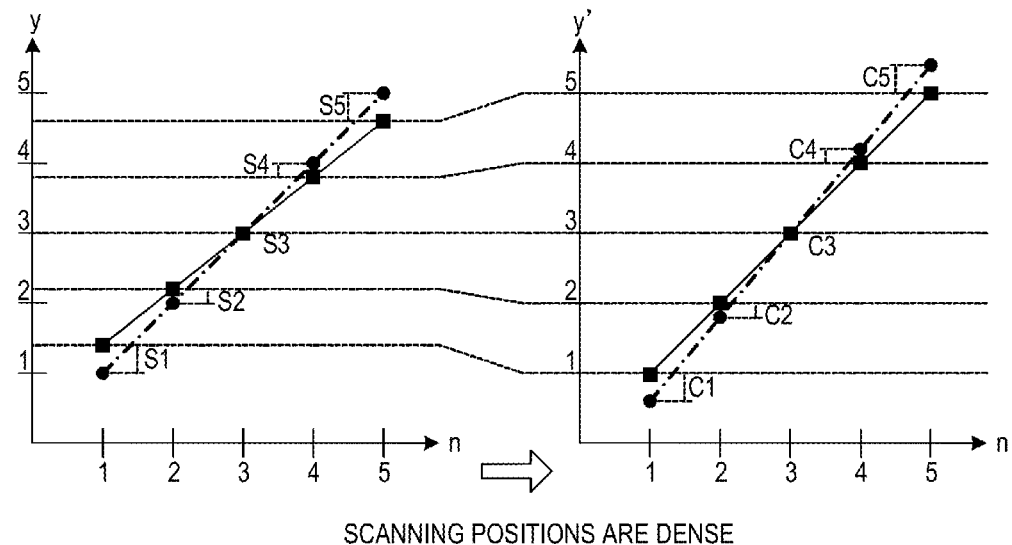
FIG. 10A and FIG. 10B are each a graph for showing coordinate transformation of pixel positions in the sub-scanning direction according to the first and second embodiments.
Figure 10B:
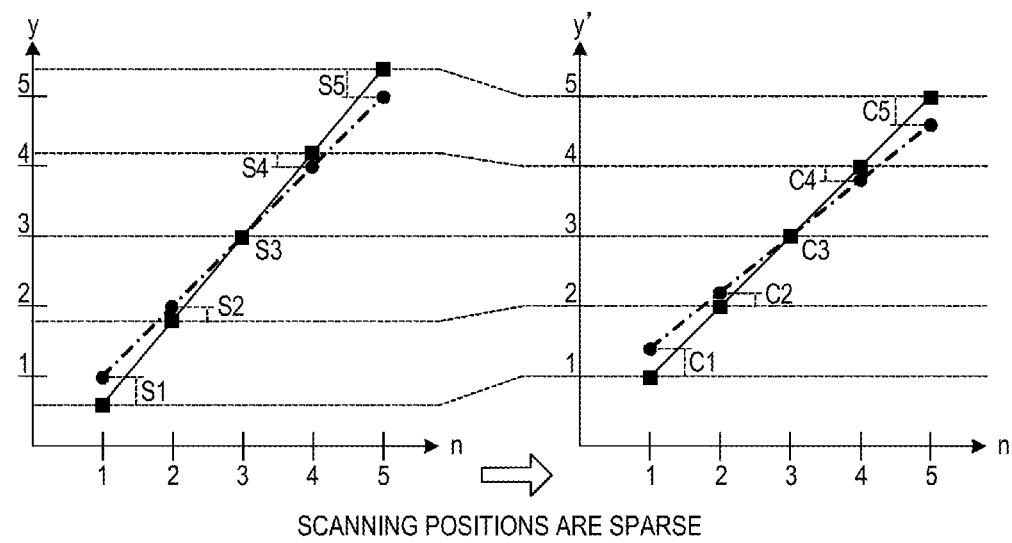

The broken lines connecting FIG. 9A and FIG. 9B to each other represent the correspondence from an original coordinate position of the y-axis to a coordinate position of the y'-axis after the coordinate transformation from the left to the right, and indicate a state in which a lower half (corresponding to n≤2) of the y-axis expands, and an upper half (corresponding to n≥2) contracts before and after the coordinate transformation. A procedure for determining a coordinate after the coordinate transformation of each pixel of input image data through the coordinate transformation of FIG. 9A and FIG. 9B will be described with reference to FIG. 9C and FIG. 9D. In the same manner as in FIG. 9A and FIG. 9B, a horizontal axis in FIG. 9C and FIG. 9D represents a pixel number "n", and a vertical axis "y" (or y') represents scanning positions in the sub-scanning direction. FIG. 9C is an illustration before the coordinate transformation, and FIG. 9D is an illustration after the coordinate transformation. A relationship between the pixel number and the coordinate position "y" of the input image data will be described below. First, the broken line of FIG. 9C represents a function fs(n) representing ideal scanning positions before the coordinate transformation and is represented by Expression (12).

$$y=fs(n) \qquad \text{Expression (12)}$$

Further, in the embodiment, the interval between the pixels in the sub-scanning direction of the input image data is uniform, and hence the function fs(n) is represented by Expression (13).

$$fs(n)=n \qquad \text{Expression (13)}$$

A scanning position of the y'-coordinate after the coordinate transformation of a pixel number of interest ns of the input image data is determined through three steps described below. In the first step, when the y-coordinate of an ideal scanning position corresponding to the pixel number "ns" of the input image data is defined as "ys", "ys" can be determined by Expression (14).

$$ys=fs(ns) \qquad \text{Expression (14)}$$

A pixel number "nt" in which the scanning position before the coordinate transformation is the same on the photosensitive drum 102 (solid line) is determined ((1) of FIG. 9C). The scanning position on the photosensitive drum 102 is represented by the function y=ft(n), and a relationship of ys=ft(nt) holds. When an inverse function of the function ft(n) is defined as $ft^{-1}(y)$, the pixel number "nt" is represented by Expression (15).

$$nt=ft^{-1}(ys) \qquad \text{Expression (15)}$$

In the second step, the y'-coordinate after the coordinate transformation (defined as "yt") corresponding to the pixel number "nt" of the scanning position on the photosensitive drum 102 is determined by Expression (16) with the use of the function ft'(n) after the coordinate transformation ((2) of FIG. 9D).

$$yt=ft'(nt) \qquad \text{Expression (16)}$$

The pixel number "ns" holds even when any number is selected, and hence an expression for determining the position "yt" of the y'-coordinate after the coordinate transformation based on the pixel number "ns" corresponds to the function fs'(n) for determining the y'-coordinate in calculation based on the pixel number "n" of the input image data. Thus, a general expression represented by Expression (17) is derived from Expressions (14) to (16). A function indicating the ideal scanning position represented by the broken line after the coordinate transformation is represented by y'=fs'(n) ((3) of FIG. 9D).

$$yt=fs'(ns)=ft'(nt)=ft'(ft^{-1}(ys))=ft'(ft^{-1}(fs(ns)))$$

"ns" is generalized into "n" to obtain Expression (17).

$$fs'(n)=ft'(ft^{-1}(fs(n))) \qquad \text{Expression (17)}$$

Further, Expression (13) and Expression (11) in which the pixel interval of the input image data and the interval of the scanning positions after the coordinate transformation are set to be uniform, with the distance of 1, are substituted into Expression (17). Then, Expression (17) is represented by Expression (18) with the use of the inverse function $ft^{-1}(n)$ of the function ft(n) for deriving the scanning position from the pixel number "n".

$$fs'(n)=ft^{-1}(n) \qquad \text{Expression (18)}$$

Expression (4) in which the scanning positions are shifted uniformly in the advance direction and the return direction as illustrated in FIG. 8A and FIG. 8B, and Expression (7) for determining a position after the coordinate transformation of the input image data also have an inverse function relationship, and it can be confirmed that Expression (18) holds. Further, when applied to the case in which the dense or sparse state occurs in the scanning positions as illustrated in FIG. 10A and FIG. 10B, the function "y" representing scanning positions before the coordinate transformation is represented by Expression (19) when the function "y" is a straight line with a gradient "k", passing through (n0, y0).

$$fs(n)=y=kx(n-n0)+y0 \qquad \text{Expression (19)}$$

In order to determine a pixel position after the coordinate transformation of the y-axis of the input image data, it is only necessary that an inverse function $((1/k)\times(y-y0)+n0)$ be determined by Expressions (17) and (18), and the pixel number "n" be substituted into the inverse function, and hence Expression (20) is derived.

$$y'=(1/k)\times(n-y0)+n0 \qquad \text{Expression (20)}$$

When the scanning lines illustrated in FIG. 10A are dense, and the scanning lines illustrated in FIG. 10B are sparse, the positions of the scanning lines on the photosensitive drum 102 after the coordinate transformation can be represented by Expression (20) in both the cases. Further, a correction value Cn of the pixel number "n" is determined by Cn=fs'(n)−fs(n).

Specifically in FIG. 10A, n0=y0=3 and k=0.8 are satisfied, and Expression (21) is obtained.

$$fs'(n)=(1/0.8)\times(n-3)+3 \qquad \text{Expression (21)}$$

Figure 12C:
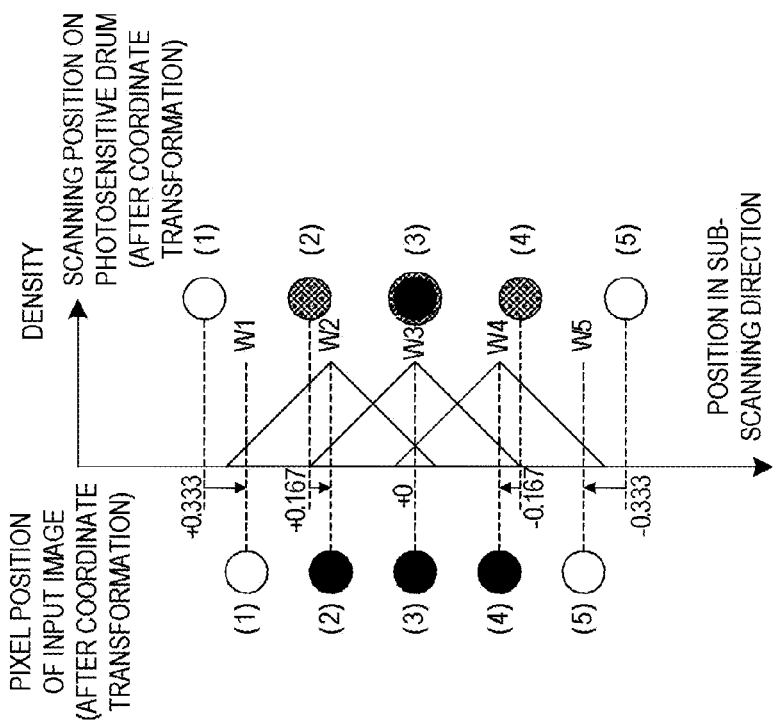

For example, in the pixel number 3, fs'(3)=3.00 is satisfied, and the correction value C3 is 0.00 (=3.00−3.00). Further, in the pixel number 5, fs'(5)=5.50 is satisfied, and the correction value C5 is +0.50 (=+5.50−5.00). The correction values C1 to C5 when the scanning positions are dense are illustrated in FIG. 12C.

Further, in FIG. 10B, n0=y0=3 and k=1.2 are satisfied, and Expression (22) is obtained.

$$fs'(n)=(1/1.2)\times(n-3)+3 \qquad \text{Expression (22)}$$

Figure 12D:
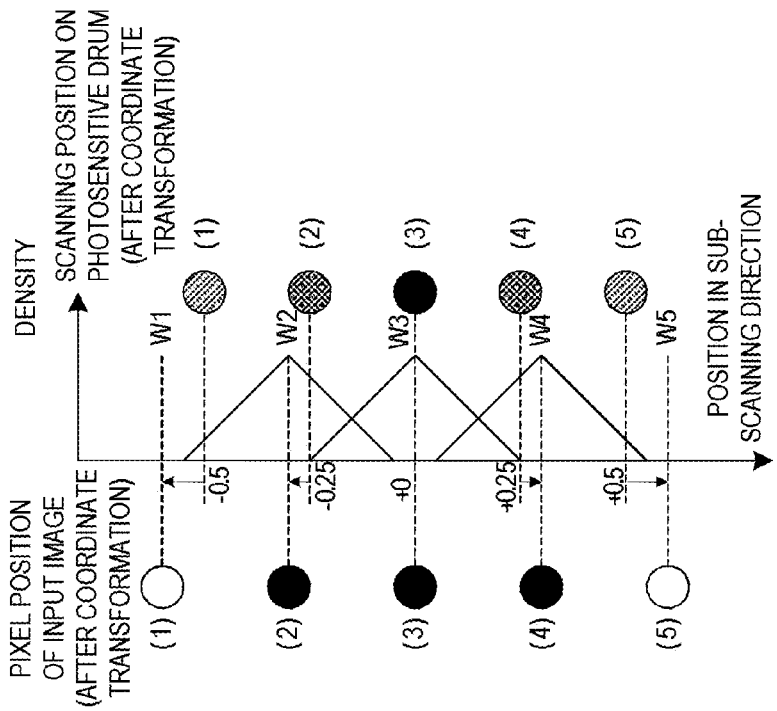

For example, in the pixel number 3, fs'(3)=3.000 is satisfied, and the correction value C3 is 0.000 (=3.000−3.000). Further, in the pixel number 5, fs'(5)=4.667 is satisfied, and the correction value C5 is −0.333 (=4.667−5.000). The correction values C1 to C5 when the scanning positions are sparse are illustrated in FIG. 12D.

Further, even when a dense or sparse state and a shift are mixed in the scanning lines, an ideal scanning position after the coordinate transformation can be determined with the use of Expression (17) or (18). The correction value setting portion 506 is configured to subject an ideal scanning position to the coordinate transformation based on a positional deviation amount to determine the correction value Cn, and output information on the correction value Cn to the filter coefficient setting portion 504.

(Filtering)

In the embodiment, the filtering is performed in order to generate correction data. In the embodiment, the filtering portion 501 is configured to perform the filtering through a convolution operation based on the following filter function. That is, the filtering portion 501 performs the filtering based on a positional relationship between the pixel positions in the sub-scanning direction of pixels obtained by correcting scanning positions in the sub-scanning direction of pixels of the input image data, and the sub-scanning positions of pixels having an interval between scanning lines transformed uniformly by the coordinate transformation. A pixel before the filtering is also referred to as an input pixel, and a pixel after the filtering is also referred to as an output pixel. Further, a pixel before the filtering is a pixel subjected to the above-mentioned coordinate transformation.

Figure 11A:
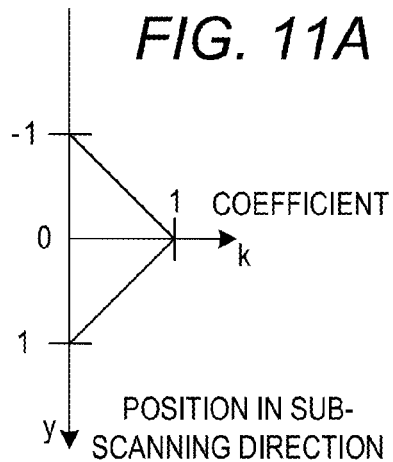
FIG. 11A, FIG. 11B, and FIG. 11C are each a graph for showing a convolution function to be used in filtering according to the first and second embodiments.
Figure 11B:
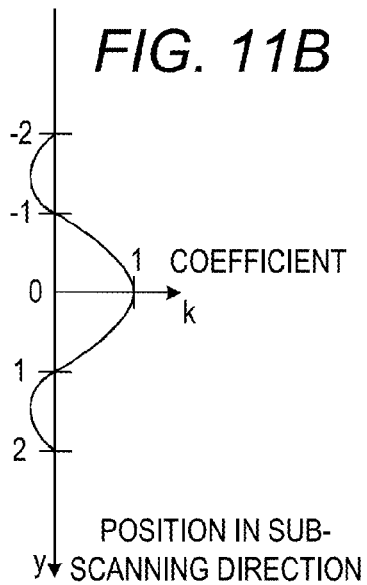
Figure 11C:
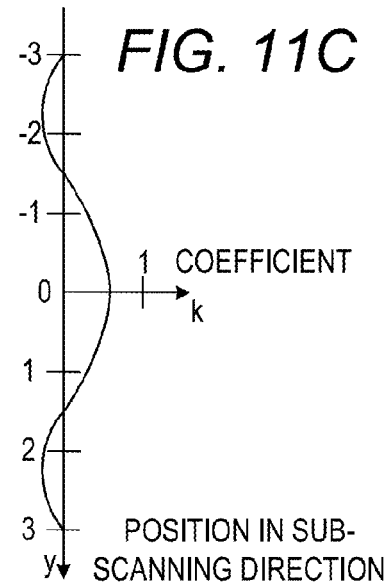

The convolution function according to the embodiment can be selected from linear interpolation illustrated in FIG. 11A, and bicubic interpolation illustrated in FIG. 11B and FIG. 11C. The filter function output portion 505 outputs information on the convolution function used in the filtering to the filter coefficient setting portion 504 as information of the table, for example. In FIG. 11A, FIG. 11B, and FIG. 11C, a vertical axis "y" represents a position in the sub-scanning direction, with a unit being a pixel, and a horizontal axis "k" represents a magnitude of a coefficient. Although the unit of the vertical axis "y" is set to a pixel, a line may be used as a unit because the sub-scanning direction is illustrated.

An expression of FIG. 11A is represented by Expression (23).

$$k = y+1 \quad (1-\le y \le 0) \qquad \text{Expression (23)}$$
$$k = -y+1 \quad (0 < y \le 1)$$
$$0 \qquad (y < -1, y > 1)$$

Expressions of FIG. 11B and FIG. 11C are represented by the following two expressions.

$$\text{bicubic}(t) \begin{cases} (a+2)|t|^3 - (a+3)|t|^2 + 1 & (|t| \le 1) \\ a|t|^3 - 5a|t|^2 + 8a|t| - 4a & (1 < |t| \le 2) \\ 0 & (2 < |t|) \end{cases} \qquad \text{Expression (24)}$$

$$k = \text{bicubic}\left(\frac{y}{w}\right)/w \qquad \text{Expression (25)}$$

In the embodiment, "a" is set to −1, and "w" is set to 1 in FIG. 10B and set to 1.5 in FIG. 10C, but "a" and "w" may be adjusted in accordance with the electrophotographic characteristics of each image forming apparatus. The filter coefficient setting portion 504 is configured to output a coefficient ("k" described later) to be used in the filtering to the filtering portion 501 based on the information on the filter function obtained from the filter function output portion 505 and the information on the correction value C output from the correction value setting portion 506.

Figure 11D:
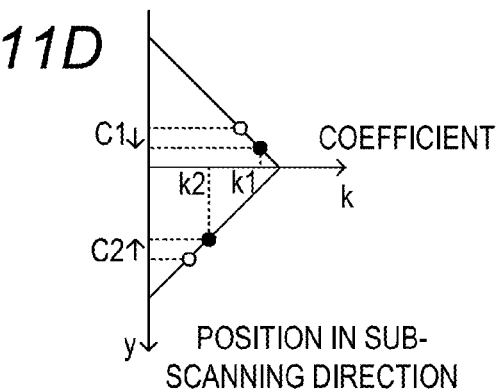
FIG. 11D is a graph for showing a correction value and a coefficient.

Now, description is given with reference to FIG. 11D. In FIG. 11D, a horizontal axis represents a coefficient "k" to be used in the filtering, and a vertical axis represents a position "y" in the sub-scanning direction. When the filter coefficient setting portion 504 receives the correction value Cn from the correction value setting portion 506, the filter coefficient setting portion 504 determines a coefficient "kn" corresponding to the correction value Cn with the use of the filter function input from the filter function output portion 505. White circles of FIG. 11D represent coefficients before the coordinate transformation. Further, in FIG. 11D, it is illustrated that coefficients k1 and k2 were set with respect to a correction value C1 and a correction value C2, respectively, as coefficients "kn" to be used in the filtering (black circles). In the embodiment, the same convolution function is applied irrespective of whether the input image data is dense or sparse, and sampling is performed at an ideal scanning position, to thereby store density per predetermined area of the input image data.

(Specific Example of Filtering)

A specific example of performing the filtering with the use of the convolution operation with a filter function by linear interpolation of Expression (23) based on a coordinate position after the coordinate transformation of the embodiment will be described with reference to FIG. 12A, FIG. 12B, FIG. 12C, and FIG. 12D. The filtering using the convolution operation is performed by the filtering portion 501. FIG. 12A to FIG. 12D correspond to FIG. 7A to FIG. 7D. Each column on the left side of FIG. 12A to FIG. 12D represents input pixels after the above-mentioned coordinate transformation. Further, each column on the right side of FIG. 12A to FIG. 12D represents scanning positions on the photosensitive drum 102 after the above-mentioned coordinate transformation. That is, the scanning positions in each column on the right side of FIG. 12A to FIG. 12D have been subjected to the coordinate transformation so as to have a uniform interval and a distance of 1.

More specifically, the scanning positions in the sub-scanning direction of input pixels after the coordinate transformation are represented by a straight line (y'=fs'(n)) indicated by the alternate long and short dash line of the graph after the coordinate transformation illustrated on the right side of FIG. 8A, FIG. 8B, FIG. 10A, and FIG. 10B. The scanning positions on the photosensitive drum 102 after the coordinate transformation are represented by a straight line (y'=fs'(n)) indicated by the solid line of the graph after the coordinate transformation illustrated on the right side of FIG. 8A, FIG. 8B, FIG. 10A, and FIG. 10B. For example, in FIG. 8A, the shift amount is +0.2 (=S), and hence fs'(n)=y−0.2=n−0.2 is satisfied after the coordinate transformation.

Further, in FIG. 12A, FIG. 12B, FIG. 12C, and FIG. 12D, the magnitude of a pixel value, that is, a density value is represented by shading of circles. Further, numbers in parentheses indicate numbers of scanning lines, and are the same as the pixel numbers illustrated in FIG. 7A to FIG. 7D. In each graph at the center of FIG. 12A, FIG. 12B, FIG. 12C, and FIG. 12D, a horizontal axis represents density, and a vertical axis represents a position in the sub-scanning direction. The convolution operation involves developing waveforms W (W1 to W5 with respect to the pixels (1) to (5)) obtained by multiplying the filter function based on each coordinate position of an input image (FIG. 11A) by a pixel value, and adding the waveforms W by superimposing.

FIG. 12A will be described first. The pixels (1) and (5) represented by white circles have a density of 0, that is, a pixel value of 0. Therefore, W1 and W5 obtained by multiplying a filter function by a pixel value are both 0. The pixels (2), (3), and (4) represented by black circles have the same density, and the maximum values of the waveforms W2, W3, and W4 are the same. Thus, the pixels (2), (3), and (4) each result in a waveform obtained by developing the filter function based on the pixel position of the input pixel. The result of the convolution operation is a sum (ΣWn, n=1 to 5) of all the waveforms.

A pixel value of an output pixel is sampled at the scanning position on the photosensitive drum 102 after the scanning position is subjected to the coordinate transformation. Therefore, for example, the pixel value (1) corresponding to the scanning position on the photosensitive drum 102 intersects with the waveform W2 at a point P0, and hence is calculated to be density D1. Further, the pixel value (2) intersects with the waveform W2 at a point P2 and the waveform W3 at a point P1, respectively, and hence is calculated to be density D1+D2. The pixel values (3) to (5) are subsequently determined in a similar manner. The pixel value (5) does not intersect with any waveform, and hence the pixel value thereof is set to 0. Further, the result obtained by calculating the pixel values (1) to (5) of FIG. 12B to FIG. 12D are represented by shading of pixels in each column on the right side.

The positional deviation of the input pixels is illustrated so as to correspond to each pixel in the vertical axis of FIG. 12A to FIG. 12D. The positional deviation amount represented by the vertical axis of FIG. 12A to FIG. 12D is information on the positional deviation amount determined by an inverse function in accordance with the coordinate transformation of the scanning positions in the sub-scanning direction of the pixels of the input image. For example, in the case of FIG. 12A, as described with reference to FIG. 8A, the correction amount C of the positional deviation amount S of the scanning lines is −0.2. Further, for example, in the cases of FIG. 12C and FIG. 12D, the correction amounts C are calculated with the use of Expressions (21) and (22), respectively.

FIG. 12A is an illustration of a state in which the scanning positions of the scanning lines are shifted in the advance direction in the sub-scanning direction, but the median points of the pixel values are shifted in the return direction, and hence the positions of the median points of the pixel values are corrected. FIG. 12B is an illustration of a state in which the scanning positions of the scanning lines are shifted in the return direction in the sub-scanning direction, but the median points of the pixel values are shifted in the advance direction, and hence the positions of the median points of the pixel values are corrected. FIG. 12C is the case in which the scanning positions are dense, and is an illustration of a state in which the distribution of density is widened due to the convolution operation after the coordinate transformation to cancel the local concentration of density, to thereby correct a local change in density. Further, FIG. 12D is the case in which the scanning positions are sparse, and is an illustration of a state in which the distribution of density is narrowed due to the convolution operation after the coordinate transformation to cancel the dispersion of density, to thereby correct a local change in density. In particular, the pixel value (3) of FIG. 12D is a density of (100+α)% that is higher than 100%.

(Filtering)

Referring back to FIG. 6, in Step S3604 of FIG. 6, the CPU 303 performs the filtering with the filtering portion 501 based on the attribute information for correction generated in Step S3603. Specifically, the CPU 303 performs a convolution operation and re-sampling with respect to the above-mentioned input image. The processing of Step S3604 performed by the CPU 303 will be described below in detail with reference to a flowchart of FIG. 13. When the CPU 303 starts the filtering through the convolution operation with the filtering portion 501, the CPU 303 performs the processing in Step S3703 and subsequent steps. In Step S3703, when the spread of the convolution function is defined as L, the CPU 303 extracts lines of an input image within a range of before and after ±L of the sub-scanning position of a line "yn" of an output image of interest, that is, the range of a width of 2L (range of from (yn−L) to (yn+L)). In this case, L is defined as a minimum value at which the value of the convolution function becomes 0 outside of the range of from +L to −L of the convolution function. For example, in linear interpolation of FIG. 11A, L is equal to 1. In bicubic interpolation of FIG. 11B, L is equal to 2. In bicubic interpolation of FIG. 11C, L is equal to 3. The ymin and ymax within a range of from ymin to ymax of the corresponding input image satisfy the following condition with the use of Expression (18).

$$ft^{-1}(y\min)=yn-L, ft^{-1}(y\max)=yn+L \quad \text{Expression (26)}$$

When Expression (26) is modified, the ymin and ymax are determined by Expression (27).

$$y\min=ft(yn-L), y\max=ft(yn+L) \quad \text{Expression (27)}$$

Thus, the lines of the input image to be extracted with respect to the line "yn" of the output image of interest are lines of all the integers within a range of from ymin to ymax.

When the line of the output image of interest is denoted by "yn", and the line of the input image to be subjected to the convolution operation is denoted by "ym", a distance dnm is represented by Expression (28).

$$dnm=yn-ft^{-1}(ym) \quad \text{Expression (28)}$$

Thus, in Step S3704, the CPU 303 obtains a coefficient knm as a convolution function g(y) with the filter coefficient setting portion 504 by Expression (29).

$$knm=g(dnm) \quad \text{Expression (29)}$$

In Step S3713, the CPU 303 determines whether or not the current scanning line is a leading line in the processing of eight lines, more specifically, whether or not a remainder (y % 8, % means Modulo operation) obtained by dividing the current scanning line "y" by 8 is 1. When the CPU 303 determines in Step S3713 that the current scanning line is the leading line of the eight lines, the CPU 303 performs processing for each scanning in Step S3714. The processing in Step S3714 will be described later with reference to FIG. 14. When the CPU 303 determines in Step S3713 that the current scanning line is not the leading line of the eight lines, the CPU 303 proceeds to processing in Step S3705.

In Step S3705, the CPU 303 refers to the built-in timer which has been started when the BD signal has been received, to thereby determine whether or not a period of time T1 has elapsed. In this case, the period of time T1 is a period of time from timing at which the BD signal is output to timing at which the laser beam reaches the leading edge of the image area in the main scanning direction of the photosensitive drum 102. In Step S3705, when the CPU 303 determines that the period of time T1 has not elapsed, the CPU 303 returns to the processing in Step S3705. When the CPU 303 determines that the period of time T1 has elapsed, the CPU 303 proceeds to the processing in Step S3706. In Step S3706, the CPU 303 initializes the position in the main scanning direction (set the position "x" to 1). In Step S3707, the CPU 303 obtains pixel data on the position in the sub-scanning direction in the input image extracted in Step S3703 and the position "x" of interest in the main scanning direction. The pixel data is defined as input pixel data Pin. In Step S3708, the CPU 303 performs the convolution operation with the filtering portion 501. More specifically, the filtering portion 501 subjects the corresponding coefficient "knm" determined in Step S3704 and the input pixel data $Pin_m$ obtained in S3707 to a product-sum operation, to thereby determine a value $Pout_n$ of the pixel of interest. The input pixel data $Pin_m$ is density of the pixel of interest before the filtering, and the value $Pout_n$ of the pixel of interest is output pixel data and is density of the pixel of interest after the filtering.

$$Pout_n = \sum_{m}^{all} k_{nm} \cdot Pin_m \quad \text{Expression (30)}$$

Expression (30) corresponds to FIG. 12A to FIG. 12D. The darkness (density) of the circles on the left side in FIG. 12A to FIG. 12D corresponds to the input pixel data $Pin_m$. D1 and D2 in FIG. 12A correspond to $k_{nm} \times Pin_m$. The darkness (density) of the circles on the right side in FIG. 12A to FIG. 12D corresponds to Pout.

In Step S3709, the CPU 303 adds 1 to the position "x" in the main scanning direction. In Step S3710, the CPU 303 determines whether or not one line has been completed, that is, whether or not the scanning has reached the last pixel in one line. When the CPU 303 determines that one line has not been completed, the CPU 303 returns to the processing in Step S3707. When the CPU 303 determines that one line has been completed, the CPU 303 terminates the filtering. Thus, in the embodiment, distortion and uneven image density of an image caused by the deviation of an irradiation position due to a variation in arrangement intervals of light emitting points of a laser light source and the optical face tangle error of the mirror faces of the rotary polygon mirror 204 are corrected by subjecting a pixel position of an input image to the coordinate transformation based on a profile of positional deviation in the sub-scanning direction of the input image. Then, the filtering and sampling are performed, thereby being capable of cancelling positional deviation and local biased density such as banding while maintaining the density of each input image, with the result that a satisfactory image can be obtained.

(Calculation of Positional Deviation Amount taking Uneven Speed of Photosensitive Drum into Account)

Figure 14:
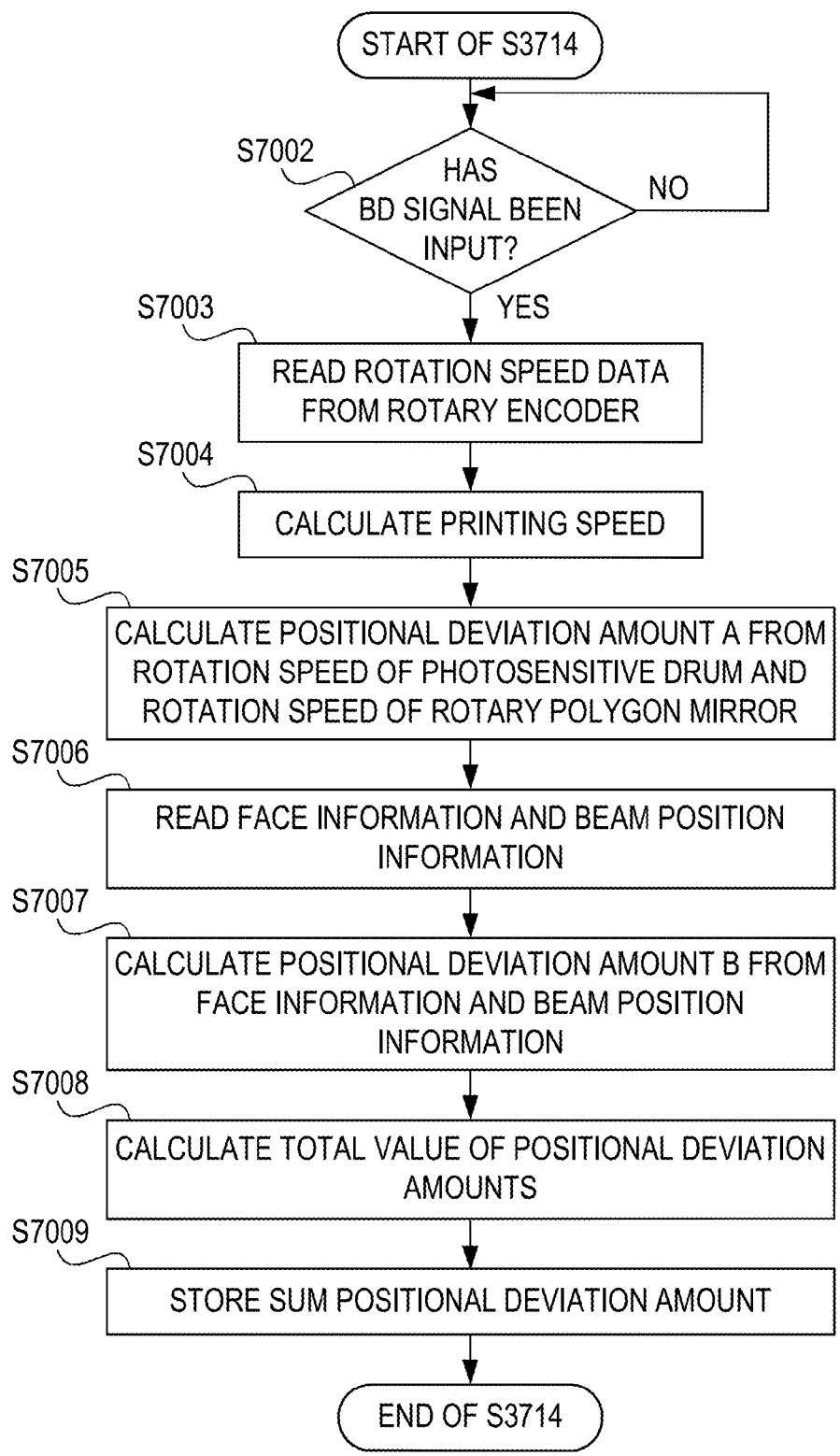
FIG. 14 is a flowchart for illustrating calculation processing of a positional deviation amount according to the first and second embodiments.

The details of processing for each scanning in Step S3714 will be described with reference to FIG. 14. FIG. 14 is a flowchart for illustrating processing of calculating a positional deviation amount performed by the CPU 303. The CPU 303 is configured to calculate a positional deviation amount for each scanning line until the predetermined period of time T1 elapses from detection of the BD signal (see FIG. 5) at a time of image formation, to thereby perform the control illustrated in FIG. 14 once per scanning. In Step S7002, the CPU 303 determines whether or not the BD signal has been input from the BD 207. When the CPU 303 determines in Step S7002 that the BD signal has been input, the CPU 303 stops the timer (not shown) measuring a time interval as a cycle of the BD signal, reads a timer value, and stores the timer value in an internal register. Then, in order to measure a time interval up to a time when the next BD signal is received, the CPU 303 resets and starts the timer (not shown) and proceeds to processing in Step S7003. In the case where the CPU 303 includes two or more timers (not shown), different timers may be used alternately every time the BD signal is received, to thereby measure a time interval. Further, in this case, the measured time interval of the BD signal is stored in the internal register of the CPU 303, but the measured time interval may be stored in, for example, a RAM (not shown) serving as a storage unit for the CPU 303. When the CPU 303 determines in Step S7002 that the BD signal has not been input, the CPU 303 repeats the control in Step S7002 so as to wait for the input of the BD signal.

In Step S7003, the CPU 303 reads rotation speed data of the photosensitive drum 102 from the rotary encoder 301. In Step S7004, the CPU 303 calculates a printing speed Vpr based on the time interval of the BD signal stored in the internal register. The printing speed Vpr is calculated by dividing a value, which is obtained by multiplying the number of beams of the laser light source 201 by the interval of the scanning lines, by ΔT (time interval of the BD signal). For example, in the case of the embodiment, the number of beams is eight, and the interval of the scanning lines is 21.16 μm (resolution: 1,200 dpi), and hence Vpr=(8×21.16 μm)/ΔT is satisfied. A rotation speed Vp of the rotary polygon mirror 204 has a proportional relationship with the printing speed Vpr, and hence can be determined from the calculated printing speed Vpr. In Step S7005, the CPU 303 calculates a positional deviation amount A based on the rotation speed of the photosensitive drum 102 read in Step S7003 and the rotation speed of the rotary polygon mirror 204 calculated in Step S7004. A calculation method for the positional deviation amount A will be described in detail later.

In Step S7006, the CPU 303 reads face information (Y1 to Y5 in Table 1) and beam position information (X1 to X7 in Table 1) of the rotary polygon mirror 204 from the memory 302. In Step S7007, the CPU 303 calculates a positional deviation amount B (=Zmn) with the use of Expression (2) based on the face information and the beam position information read in Step S7006. In Step S7008, the CPU 303 adds up the positional deviation amount A calculated in Step S7005 and the positional deviation amount B calculated in Step S7007, to thereby calculate a sum (total value) of the positional deviation amounts. In Step S7009, the CPU 303 stores the sum positional deviation amount calculated in Step S7008 in the internal register of the CPU 303. In this case, the positional deviation amount stored in the internal register is read and used for calculation at a time of the filtering described above.

(Calculation of Positional Deviation Amount)

A calculation expression of the positional deviation amount A calculated by the CPU 303 in Step S7005 will be described in detail. When the rotation speed of the photosensitive drum 102 is denoted by Vd, the rotation speed of the rotary polygon mirror 204 is denoted by Vp, and one scanning period is denoted by ΔT (see FIG. 5), the positional deviation amount A caused by a speed difference between the rotation speed Vd of the photosensitive drum 102 and the rotation speed Vp of the rotary polygon mirror 204 is calculated by Expression (31).

$$A=(Vd-Vp)\times \Delta T \quad \text{Expression (31)}$$

In Expression (31), ΔT represents a period of time corresponding to an interval of output timing of the BD signal, and the positional deviation amount A represents a positional deviation amount of scanning lines that move during one scanning period due to the difference between the rotation speed Vd of the photosensitive drum 102 and the rotation speed Vp of the rotary polygon mirror 204. As described above, the rotation speed Vp of the rotary polygon mirror 204 is determined based on the printing speed Vpr. Then, the printing speed Vpr is determined based on the relationship between the one scanning period ΔT and the number of light emitting points (the light emitting points are eight in the embodiment) by Expressions (32) and (33).

$$Vp=\text{Number of beams}\times 21.16/\Delta T \quad \text{Expression (32)}$$

$$\Delta T=1/(\text{Number of mirror faces of rotary polygon mirror 204}\times\text{Revolutions per second of rotary polygon mirror 204}) \quad \text{Expression (33)}$$

When the positional deviation caused by an uneven speed of the photosensitive drum 102 of the n-th scanning line from the reference position in the sub-scanning direction is denoted by An, the positional deviation in the sub-scanning direction is represented by an accumulation of the positional deviation of each scanning. Further, when the positional deviation amount based on the face information of the rotary polygon mirror 204 of the n-th scanning line from the reference position in the sub-scanning direction and the beam information is denoted by Bn, the position "y" in the sub-scanning direction of the n-th scanning line is represented by Expression (34).

$$y = n + \left(B_n + \sum_{p=1}^{n} A_p\right) \quad \text{Expression (34)}$$

The value "y" on the left side of Expression (34) is defined only when n is an integer. That is, the value "y" is a discrete function. However, in the embodiment, each value "y" determined from an integer is interpolated by linear interpolation and handled as a continuous function y=ft(n). In the embodiment, linear interpolation is used so as to simplify hardware, but interpolation of the function may be performed by other methods such as Lagrange interpolation and spline interpolation.

When the pixel positions in the sub-scanning direction are denoted by yno and ynoil with respect to pixel numbers n0 and n0+1 in the embodiment, an expression of conversion into the continuous function within a range of from the pixel position $y_{n0}$ to the pixel position $y_{n0+1}$ in the sub-scanning direction is given below.

$$y=y_{n0}\times(1-n+n0)+y_{n0+1}\times(n-n0) \quad \text{Expression (35)}$$

The processing of FIG. 14 is performed once per scanning, that is, once for eight beams (eight scanning lines). Therefore, in Steps S7006 to S7008, the positional deviation amounts of the eight beams are collectively calculated, and all the calculated positional deviation amounts of the eight beams are stored in Step S7009.

The rotation speed data of the photosensitive drum 102 is obtained in real time from the rotary encoder 301 and fed back to positional deviation correction. However, a profile of speed fluctuation data measured in advance may be stored in the memory 302, and positional deviation may be corrected in accordance with the stored profile. Further, when positional deviation information is obtained in real time, the positional deviation information may be directly used for correction of positional deviation although control is delayed. In this case, in order to prevent the influence caused by the delayed control, a particular frequency component such as a high-frequency component may be filtered with respect to a fluctuation amount of positional deviation to be used for correction of positional deviation.

Further, besides the linear interpolation and bicubic interpolation used as interpolation systems of the embodiment, interpolation in which a window function of a desired size is applied to a Sinc function or interpolation involving determining a convolution function in accordance with intended filter characteristics may be performed. Further, the present invention can be applied to an image output system or an image output device in which an interval between output pixels and lines is distorted irrespective of whether the system is an LED exposure system or an electrophotographic system. Further, in the embodiment, interpolation is performed by correcting a position of a pixel of an input image in accordance with Expressions (17) and (18), but functions approximate to Expressions (17) and (18) may be selected to be used for correction depending on the intended correction accuracy. Further, the configuration using the CPU 303 as the controller is described, but an application specific integrated circuit (ASIC), for example, may be used.

<Second Correction of Image Data>

Next, second correction processing according to the embodiment will be described. When the linearity defect occurs at a time when banding is corrected by moving an image center of gravity through addition of image data, an error is caused in an exposure amount of image data to be added, and hence an error also occurs in the movement amount of the image center of gravity. Therefore, in the second correction processing according to the embodiment, image data (pixel value) of a pixel output in the first correction processing is corrected by moving the image data in the main scanning direction so that the image data reaches a predetermined value or more.

Figure 15:
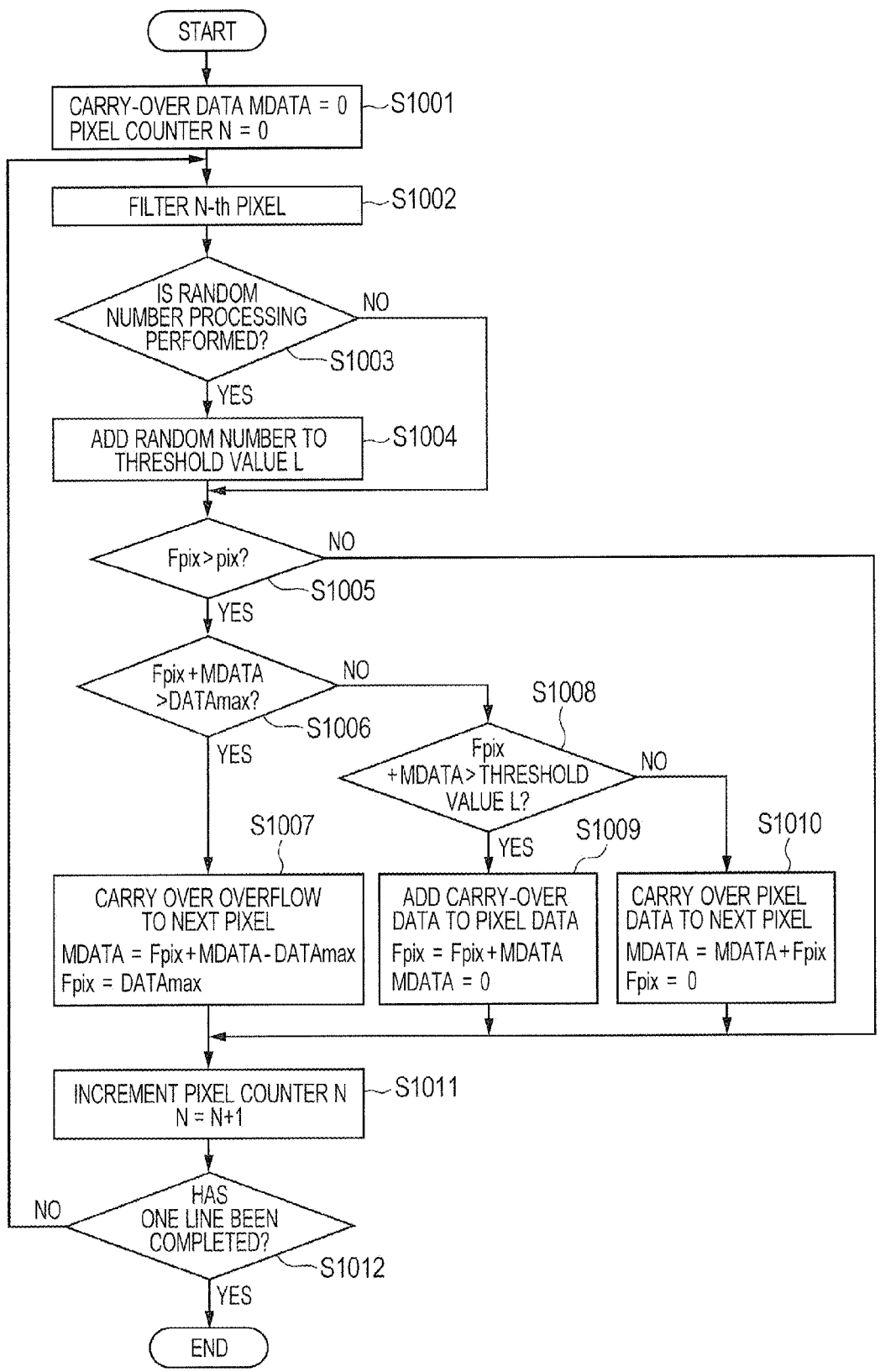
FIG. 15 is a flowchart for illustrating second correction processing according to the first embodiment.

The details of the second correction processing will be described with reference to the flowchart of FIG. 15. FIG. 15 is a flowchart for illustrating a control sequence performed by the CPU 303 every scanning line in the sub-scanning direction. The laser light source 201 used in the embodiment includes eight light emitting points. Eight scanning lines are formed during one scanning. Thus, the processing of FIG. 15 is simultaneously performed in parallel for each scanning line. Further, the processing of FIG. 15 is successively performed for each pixel in the main scanning direction, and every time of scanning, the above-mentioned filtering (convolution processing) is performed on the corresponding pixel. When the CPU 303 detects that the period of time T1 has elapsed from the reception of the BD signal in FIG. 5, the CPU 303 performs the processing of FIG. 15.

In Step S1001, the CPU 303 sets 0 to carry-over data MDATA (MDATA=0) and sets 0 to a pixel counter N (N=0). In this case, the carry-over data MDATA is a variable for temporarily holding a pixel value when image data (pixel value) designating the pulse width corresponding to the light intensity of a laser beam in the light intensity unstable area that does not emit light alone due to the light intensity shortage (see FIG. 20A) is added to the surrounding pixels in the main scanning direction. Further, the pixel counter N is a variable corresponding to a pixel number in the main scanning direction. In Step S1002, the CPU 303 subjects the pixel designated by the pixel counter N to the above-mentioned filtering calculation, to thereby determine image data (pixel value) for moving an image center of gravity. The pixel value of the corresponding pixel before the filtering is performed (before correction) is hereinafter referred to as a pre-processing pixel value pix, and the pixel value of the corresponding pixel after the filtering is hereinafter referred to as a post-processing pixel value Fpix.

In Step S1003, the CPU 303 determines whether or not random number processing is performed. When the CPU 303 determines that the random number processing is performed, the CPU 303 proceeds to the processing in Step S1004. When the CPU 303 determines that the random number processing is not performed, the CPU 303 proceeds to the processing in Step S1005. In the embodiment, for example, in the adjustment step of the light scanning device 104 in a factory, data designating whether or not the random number processing is performed is stored in the memory 302 through a user interface portion (not shown). The CPU 303 reads data designating the necessity of the random number processing from the memory 302, and determines the necessity of the random number processing in accordance with the read data. In Step S1004, the CPU 303 adds a value (integer of 1 or more in the embodiment) generated by the random number processing to an initial value of a threshold value L for determining the linearity of a light intensity of a laser beam with respect to the PWM signal. In this case, the threshold value L is a variable representing a pixel value that is set in advance so as to be higher than a pixel value of image data causing the linearity defect in the PWM signal (for example, the case where the pulse width of the PWM signal of FIG. 20B is from 1 to 4). When a random number is added to the threshold value L to make the threshold value L variable, image data (pixel value) of a pixel generated by the filtering is prevented from including a particular period component, with the result that the occurrence of moire and the like can be prevented.

In Step S1005, the CPU 303 determines whether or not the post-processing pixel value Fpix that is image data after the filtering of the corresponding pixel is larger than the pre-processing pixel value pix that is image data before the filtering. When the CPU 303 determines that the post-processing pixel value Fpix is larger than the pre-processing pixel value pix that is image data before the filtering (Fpix>pix), the CPU 303 proceeds to the processing in Step S1006. Meanwhile, when the CPU 303 determines that the post-processing pixel value Fpix is not larger than the pre-processing pixel value pix that is image data before the filtering (Fpix≤pix), the CPU 303 proceeds to the processing in Step S1011.

In Step S1006, the CPU 303 determines whether or not a sum of the post-processing pixel value Fpix and the carry-over data MDATA is larger than a density maximum value DATAmax that is a maximum light emission intensity of the PWM signal. When the CPU 303 determines that the sum of the post-processing pixel value Fpix and the carry-over data MDATA is larger than the density maximum value DATAmax that is the maximum light emission intensity of the PWM signal (Fpix+MDATA>DATAmax), the CPU 303 proceeds to the processing in Step S1007. Meanwhile, when the CPU 303 determines that the sum of the post-processing pixel value Fpix and the carry-over data MDATA is not larger than the density maximum value DATAmax that is the maximum light emission intensity in the PWM signal (Fpix+MDATA≤DATAmax), the CPU 303 proceeds to the processing in Step S1008. In this case, for example, when the density maximum value DATAmax is expressed with four bits as in the PWM signal of FIG. 20B, the density maximum value DATAmax is 16.

In Step S1007, the CPU 303 sets data described below to the post-processing pixel value Fpix and the carry-over data MDATA. That is, the CPU 303 sets the density maximum value DATAmax to the post-processing pixel value Fpix by Expression (37), and sets an excessive portion (overflow portion) from the density maximum value DATAmax to the carry-over data MDATA by Expression (36).

$MDATA=Fpix+MDATA-DATAmax$  Expression (36)

$Fpix=DATAmax$  Expression (37)

In Step S1008, the CPU 303 determines whether or not the sum of the post-processing pixel value Fpix and the carry-over data MDATA is larger than the threshold value L described above. When the CPU 303 determines that the sum of the post-processing pixel value Fpix and the carry-over data MDATA is larger than the threshold value L (Fpix+MDATA>threshold value L), the CPU 303 proceeds to the processing in Step S1009. Meanwhile, when the CPU 303 determines that the sum of the post-processing pixel value Fpix and the carry-over data MDATA is not larger than the threshold value L (Fpix+MDATA≤threshold value L), that is, the sum is equal to or less than the threshold value L that is a predetermined value (equal to or less than the predetermined value), the CPU 303 proceeds to the processing in Step S1010.

In Step S1009, the CPU 303 sets data described below to the post-processing pixel value Fpix and the carry-over data MDATA. That is, the CPU 303 adds the carry-over data MDATA to the post-processing pixel value Fpix by Expression (38), and sets 0 to the carry-over data MDATA by Expression (39).

$$Fpix=Fpix+MDATA \qquad \text{Expression (38)}$$

$$MDATA=0 \qquad \text{Expression (39)}$$

In Step S1010, the CPU 303 sets data described below to the post-processing pixel value Fpix and the carry-over data MDATA. That is, the CPU 303 adds the post-processing pixel value Fpix to the carry-over data MDATA by Expression (40), and sets 0 to the post-processing pixel value Fpix by Expression (41).

$$MDATA=MDATA+Fpix \qquad \text{Expression (40)}$$

$$Fpix=0 \qquad \text{Expression (41)}$$

In Step S1011, the CPU 303 increments the pixel counter N (N=N+1) and proceeds to the processing in Step S1012. In Step S1012, the CPU 303 refers to the pixel counter N to determine whether or not the value of the pixel counter N indicates the maximum pixel number of one scanning line (one scanning line is completed). When the CPU 303 determines that the value of the pixel counter N has reached the pixel number corresponding to one scanning line, the CPU 303 terminates the processing. When the CPU 303 determines that the value of the pixel counter N has not reached the pixel number corresponding to one scanning line, the CPU 303 returns to the processing in Step S1002.

When an image is formed on an A4 size sheet (length in the main scanning direction is 297 mm) with a resolution of 1,200 dpi, the width of one pixel is 21.16 μm, and hence the number of pixels of one scanning line is about 14,000. Through a series of the processing of FIG. 15, the processing of the pixels from 1 to 14,000 in the main scanning direction is successively performed. In the flow illustrated in the flowchart of FIG. 15, when the sum of the post-processing pixel value Fpix and the carry-over data MDATA is larger than the threshold value L for determining the linearity, image data to be the sum of the post-processing pixel value Fpix and the carry-over data MDATA is generated (Step S1009). Meanwhile, when the sum of the post-processing pixel value Fpix and the carry-over data MDATA is smaller than the threshold value L, the post-processing pixel value Fpix is added to the carry-over data MDATA so as to be carried over to an adjacent pixel positioned on a downstream side in the main scanning direction (Step S1010). Therefore, in the processing of FIG. 15, an image is not generated for a pixel having a pixel value smaller than the threshold value L for determining the linearity. Further, when the post-processing pixel value Fpix after the filtering is larger than the pre-processing pixel value pix before the filtering in Step S1005, the control in Steps S1006 to S1010, that is, the control of not forming an image of image data causing the linearity defect is performed. With this, an image that is newly generated by the filtering is selectively subjected to the processing in Steps S1006 to S1010. As a result, the image data that has existed from before the filtering is not subjected to the correction processing in FIG. 15, and hence an original image can be maintained to the fullest extent possible. Further, through addition of a random number to the threshold value L in Step S1004, the post-processing pixel value Fpix to be generated is prevented from including a particular period component, and the occurrence of moire and the like can be prevented.

Next, the processing of FIG. 15 is described specifically with reference to FIG. 16A to FIG. 16D. FIG. 16A to FIG. 16D are each a table for showing image data in which the number of pixels in one line (one scanning line) is eleven (N=0 to N=10), and the number of scanning lines in the sub-scanning direction is six (first to sixth lines). A blank space in each table of FIG. 16A to FIG. 16D represents image data having a pixel value of 0. FIG. 16A is an example of image data (pixel value) before the filtering, and in this case, image data that is to form an image exists only in the third and fourth lines. FIG. 16B is an example of image data at a time when an image center of gravity is moved downward in the length direction in the table by the filtering in Step S1002 of FIG. 15 with respect to the data shown in FIG. 16A. In FIG. 16B, relative to FIG. 16A, pixel values of all the pixels in the third line are decreased by 2 from 15 to 13, pixel values of all the pixels in the fifth line are increased by 2 from 0 to 2, and pixel values of all the pixels in the fourth line remain unchanged at 15.

FIG. 16C is a table for showing processing results at a time when the threshold value L is 4, the maximum density value DATAmax is 16, and it is determined in Step S1003 that a random number is not added in FIG. 15, and is an example of image data at a time when image data (pixel value) of a pixel having the threshold value L or less is added in the main scanning direction. The image data (pixel value) of each pixel after the filtering (FIG. 16B) in the first to fourth lines and the sixth line has the same value or a smaller value relative to that of the image data before the filtering (FIG. 16A). Thus, the image data of each pixel in the first to fourth lines and the sixth line is determined to be NO (represented as in FIG. 15) in Step S1005 of FIG. 15. Therefore, the same data value as that of the image data after the filtering (FIG. 16B) is set to the image data (pixel value) of each pixel in the first to fourth lines and the sixth line of FIG. 16C.

Meanwhile, the image data value 2 after the filtering of each pixel in the fifth line shown in FIG. 16B is increased relative to the image data value 0 before the filtering shown in Table 16A, and hence the processing in Steps S1006 to S1010 of FIG. 15 is performed. That is, when N is 0, the post-processing pixel value Fpix is 2, and the carry-over data MDATA is 0. Thus, the processing in Step S1010 is performed so that 0 is set to the post-processing pixel value Fpix at N=0, and 2 is set to the carry-over data MDATA. When N is 1, the post-processing pixel value Fpix is 2, and the carry-over data MDATA is 2. Thus, the processing in Step S1010 is performed so that 0 is set to the post-processing pixel value Fpix at N=1, and (=2+2) is set to the carry-over data MDATA. When N is 2, the post-processing pixel value Fpix is 2, and the carry-over data MDATA is 4. Thus, the processing in Step S1009 is performed so that 6 (=2+4) is set to the post-processing pixel value Fpix at N=2, and 0 is set to the carry-over data MDATA. When N is 3, the post-processing pixel value Fpix is 2, and the carry-over data MDATA is 0. Thus, the processing in Step S1010 is performed so that 0 is set to the post-processing pixel value Fpix at N=3, and 2 is set to the carry-over data MDATA. When N is 4, the post-processing pixel value Fpix is 2, and the carry-over data MDATA is 2. Thus, the processing in Step S1010 is performed so that 0 is set to the post-processing pixel value Fpix at N=4, and 4 (=2+2) is set to the carry-over data MDATA. When N is 5, the post-processing pixel value Fpix is 2, and the carry-over data MDATA is 4. Thus, the processing in Step S1009 is performed so that 6 (=2+4) is set to the post-processing pixel value Fpix at N=5, and 0 is set to the carry-over data MDATA. Also when N is 6 to 10, the processing performed when N is 0 to 4 is performed. For the fifth line, the data value of each pixel is added in the main scanning direction (rightward direction in FIG. 16C) to the image data value (pixel value) 2 generated by the filtering, and an image data value that is not 0 is set with a pixel having a data value larger than the threshold value L (=4), to thereby determine an exposure amount.

FIG. 16D is a table for showing processing results at a time when the threshold value L is 4, the maximum density value DATAmax is 16, and it is determined in Step S1003 that a random number is added in FIG. 15, and is an example of image data at a time when image data (pixel value) of a pixel having the threshold value L or less is added in the main scanning direction. In the same manner as in FIG. 16C, the image data of each pixel in the first to fourth lines and the sixth line is determined to be NO (represented as "N" in FIG. 15) in Step S1005 of FIG. 15. Therefore, the same data value as that of the image data after the filtering (FIG. 16B) is set to the image data (pixel value) of each pixel in the first to fourth lines and the sixth line of FIG. 16D.

Meanwhile, the image data value 2 after the filtering of each pixel in the fifth line shown in FIG. 16B is increased relative to the image data value 0 before the filtering shown in Table 16A, and hence the processing in Steps S1006 to S1010 of FIG. 15 is performed. In FIG. 16D, random number addition is selected, and hence the image data (pixel value) in the fifth line of FIG. 16D is described with reference to FIG. 17 that is a table for showing a change in threshold value L through random number addition. In FIG. 17, N represents pixel No. (0 to 10). Each numerical value shown in a column of the threshold value L indicates the threshold value L obtained by subjecting an initial value (=4) of the threshold value L to random number addition, and each numerical value in parentheses indicates an added random number. A column of Fpix+MDATA represents a sum of the post-processing pixel value Fpix and the carry-over data MDATA corresponding to the pixel N. Further, a column of the post-processing pixel value Fpix represents the post-processing pixel value Fpix of each pixel set as a result of performing the processing of FIG. 15. The processing of FIG. 15 is described below with reference to FIG. 17. When N is 0, the post-processing pixel value Fpix is 2, the carry-over data MDATA is 0, Fpix+MDATA is 2, and the threshold value L is 5. Thus, the processing in Step S1010 is performed so that 0 is set to the post-processing pixel value Fpix at N=0, and 2 is set to the carry-over data MDATA. When N is 1, the post-processing pixel value Fpix is 2, the carry-over data MDATA is 2, Fpix+MDATA is 4, and the threshold value L is 5. Thus, the processing in Step S1010 is performed so that 0 is set to the post-processing pixel value Fpix at N=1, and 4 (=2+2) is set to the carry-over data MDATA. When N is 2, the post-processing pixel value Fpix is 2, the carry-over data MDATA is 4, Fpix+MDATA is 6, and the threshold value L is 8. Thus, the processing in Step S1010 is performed so that 0 is set to the post-processing pixel value Fpix at N=2, and 6 (=4+2) is set to the carry-over data MDATA. When N is 3, the post-processing pixel value Fpix is 2, the carry-over data MDATA is 6, Fpix+MDATA is 8, and the threshold value L is 7. Thus, the processing in Step S1009 is performed so that 8 is set to the post-processing pixel value Fpix at N=3, and 0 is set to the carry-over data MDATA.

When N is 4, the post-processing pixel value Fpix is 2, the carry-over data MDATA is 0, Fpix+MDATA is 2, and the threshold value L is 6. Thus, the processing in Step S1010 is performed so that 0 is set to the post-processing pixel value Fpix at N=4, and 2 is set to the carry-over data MDATA. When N is 5, the post-processing pixel value Fpix is 2, the carry-over data MDATA is 2, Fpix+MDATA is 4, and the threshold value L is 7. Thus, the processing in Step S1010 is performed so that 0 is set to the post-processing pixel value Fpix at N=5, and 4 (=2+2) is set to the carry-over data MDATA. When N is 6, the post-processing pixel value Fpix is 2, the carry-over data MDATA is 4, Fpix+MDATA is 6, and the threshold value L is 5. Thus, the processing in Step S1009 is performed so that 6 is set to the post-processing pixel value Fpix at N=6, and 0 is set to the carry-over data MDATA.

When N is 7, the post-processing pixel value Fpix is 2, the carry-over data MDATA is 0, Fpix+MDATA is 2, and the threshold value L is 6. Thus, the processing in Step S1010 is performed so that 0 is set to the post-processing pixel value Fpix at N=7, and 2 is set to the carry-over data MDATA. When N is 8, the post-processing pixel value Fpix is 2, the carry-over data MDATA is 2, Fpix+MDATA is 4, and the threshold value L is 5. Thus, the processing in Step S1010 is performed so that 0 is set to the post-processing pixel value Fpix at N=8, and 4 (=2+2) is set to the carry-over data MDATA. When N is 9, the post-processing pixel value Fpix is 2, the carry-over data MDATA is 4, Fpix+MDATA is 6, and the threshold value L is 7. Thus, the processing in Step S1010 is performed so that 0 is set to the post-processing pixel value Fpix at N=9, and 6 (=4+2) is set to the carry-over data MDATA. When N is 10, the post-processing pixel value Fpix is 2, the carry-over data MDATA is 6, Fpix+MDATA is 8, and the threshold value L is 6. Thus, the processing in Step S1009 is performed so that 8 is set to the post-processing pixel value Fpix at N=10, and 0 is set to the carry-over data MDATA. As described above, in FIG. 16D, the threshold value L changes due to the random number addition as shown in FIG. 17, and hence an exposure amount that is an image data value (pixel value) after addition takes a random value.

As described above, according to the embodiment, satisfactory image quality can be obtained by correcting uneven image density of an image, which occurs in a direction corresponding to a rotational direction of a photosensitive member and preventing the occurrence of a density fluctuation caused by the linearity defect. In the embodiment, image data (pixel value) to be added for moving an image center of gravity is controlled so as to reach a previously set data amount (threshold value) or more. With this, an image to be added is formed with a pulse width capable of being stably controlled for light emission, without performing light emission with a thin pulse width that causes the linearity defect. Hence, an error in the movement amount of an image center of gravity caused by the linearity defect, and the occurrence of a density fluctuation can be prevented. Further, banding that occurs due to a rotation speed fluctuation of a photosensitive drum can be corrected without causing an error in the movement amount of an image center of gravity and a density fluctuation. Further, banding that occurs due to an optical face tangle error of a rotary polygon mirror can also be corrected without causing an error in the movement amount of an image center of gravity and a density fluctuation.

Further, in the embodiment, when image data (pixel value) to be added in the main scanning direction is a predetermined value or less, image formation is not performed, and the image data (pixel value) is added to a pixel value of an adjacent pixel in the main scanning direction. When the image data to be added spreads in the sub-scanning direction, an error is caused in the movement amount of an image center of gravity in the sub-scanning direction, and the effect of banding correction is decreased. Meanwhile, when the image data to be added is added only in the main scanning direction, an error of an exposure amount caused by the linearity defect can be cancelled without decreasing the effect of banding correction. Further, through addition of a random number to a threshold value so that the data amount of the image data to be added does not become constant, image data is generated by switching a determination threshold value of a pixel value indicating image density. With this, the image data to be added is prevented from being generated periodically, and the occurrence of moire and the like can be prevented.

Second Embodiment

In the first embodiment, when the image data of a pixel subjected to the filtering is smaller than a predetermined threshold value, the image data is added to image data of a pixel on a downstream side in the main scanning direction without performing image formation. When the image data is larger than the threshold value, image formation is performed with the use of the added image data. In the second embodiment, there is described the processing of correcting image data based on density error information on image data of a pixel subjected to the filtering. In the second embodiment, basic configurations of an image forming apparatus and a light scanning device are the same as those of the first embodiment, and the description thereof is omitted.

Figure 18:
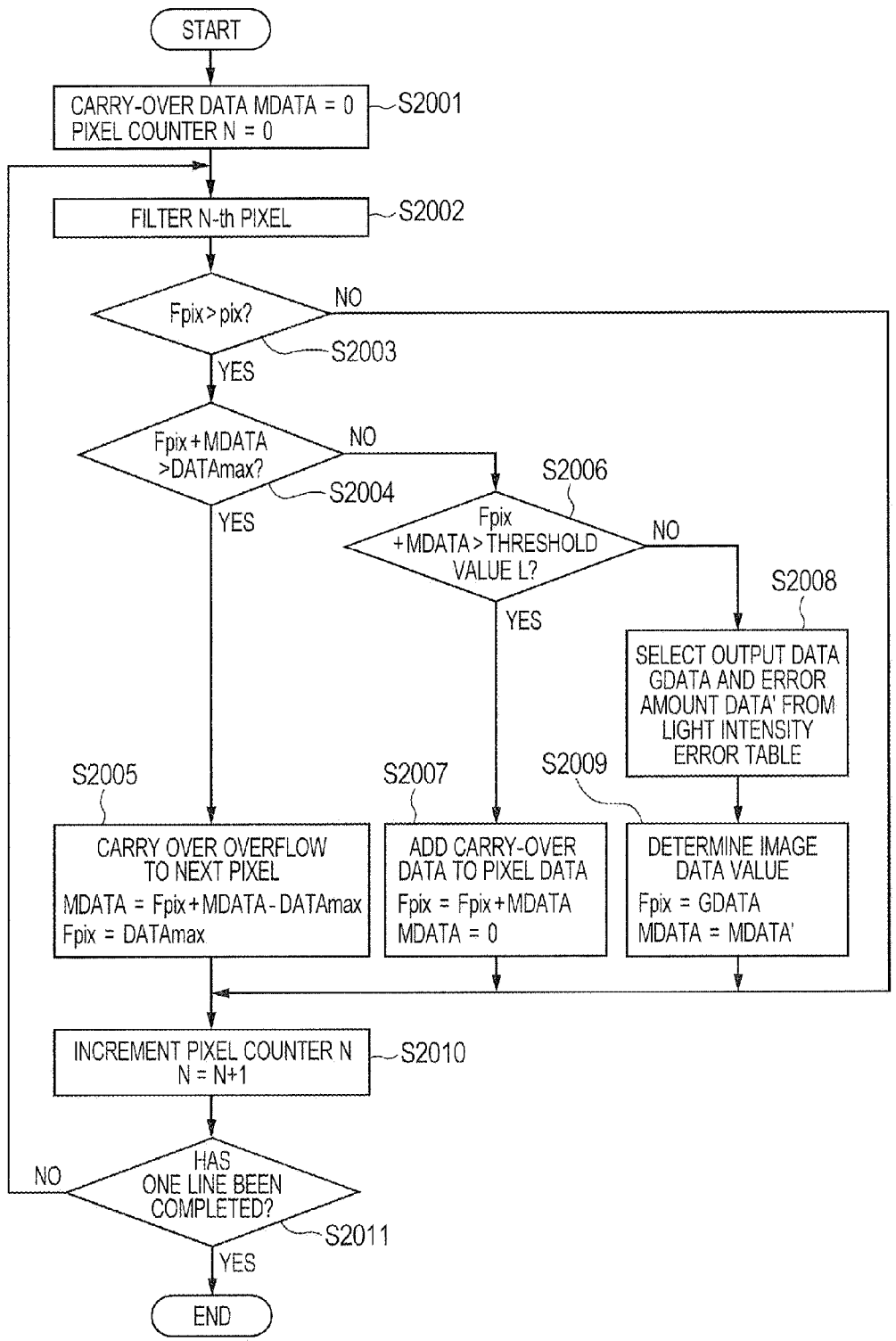
FIG. 18 is a flowchart for illustrating second correction processing according to the second embodiment.

A control sequence of the embodiment will be described with reference to the flowchart of FIG. 18. FIG. is a flowchart for illustrating a control sequence performed by the CPU 303 for each scanning line in the sub-scanning direction in the same manner as in FIG. 15 according to the first embodiment. In FIG. 18, the processing in Steps S2001 and S2002 is the same as that in Steps 1001 and S1002 of FIG. 15 according to the first embodiment, and the processing in Steps S2003 to S2007 is the same as that in Steps S1005 to S1009 of FIG. 15 according to the first embodiment. Therefore, the description thereof is omitted. Further, the processing in Steps S2010 and S2011 of FIG. 18 is the same as that in Steps S1011 and S1012 of FIG. 15 according to the first embodiment, and hence the description thereof is omitted. The processing in Steps S2008 and S2009, which is different from that of FIG. 15 according to the first embodiment, will be described below. In FIG. 18, the random number addition processing to the threshold value L, which is selectively performed in FIG. 15 according to the first embodiment, is deleted.

In Step S2006 of FIG. 18, the CPU 303 determines whether or not a sum of the post-processing pixel value Fpix and the carry-over data MDATA is larger than the threshold value L. When the CPU 303 determines that the sum of the post-processing pixel value Fpix and the carry-over data MDATA is larger than the threshold value L (Fpix+MDATA>threshold value L), the CPU 303 proceeds to the processing in Step S2007. Meanwhile, when the CPU 303 determines that the sum of the post-processing pixel value Fpix and the carry-over data MDATA is not larger than the threshold value L (Fpix+MDATA≤threshold value L), the CPU 303 proceeds to the processing in Step S2008. In Step S2008, the CPU 303 reads output data GDATA and an error amount MDATA', which correspond to the input image data value (=MDATA'), from a light intensity error table (see FIG. 19A) described later. In Step S2009, the CPU 303 sets the data described below to the post-processing pixel value Fpix and the carry-over data MDATA. That is, the CPU 303 sets the output data GDATA to the post-processing pixel value Fpix and adds the error amount MDATA' to the carry-over data MDATA by Expression (42).

$$Fpix=GDATA \quad \text{Expression (42)}$$

$$MDATA=MDATA' \quad \text{Expression (43)}$$

The error amount MDATA' is a value below a decimal point which is smaller than 1, as shown in the light intensity error table of FIG. 19A. Thus, the carry-over data MDATA is not an integer value and also has a value below a decimal point based on Expression (43). As a result, a value of input data (Fpix+MDATA) for reading the light intensity error table also has a value below a decimal point, but the input data in the light intensity error table is an integer value. Therefore, the input data (Fpix+MDATA) for reading the light intensity error table is set to an integer value obtained by rounding down decimal places. The numerical value below a decimal point rounded down in this case is added to the carry-over data MDATA.

Next, the details of the light intensity error table of FIG. 19A will be described. The light intensity error table of FIG. 19A is an example and is formed of three elements, that is, input data (Fpix+MDATA), and output data GDATA and an error amount MDATA', which correspond to the input data (Fpix+MDATA). The input data (Fpix+MDATA) is image data represented by the sum of the post-processing pixel value Fpix and the carry-over data MDATA and includes 16 stages from 0 to 15. The output data GDATA represents a value (pixel value) of the PWM signal closest to an ideal exposure amount with respect to the input data (Fpix+MDATA), that is, an exposure amount at a time when there is no linearity defect. In the embodiment, the PWM signal expresses a light intensity of a laser beam corresponding to image data (pixel value) of one pixel with four bits, and the light intensity of a laser beam is divided into fifteen stages except for the case where the PWM signal that does not radiate a laser beam is 0. For example, when the input data is 1 (PWM signal is 1), the light intensity of $\frac{1}{15}$ of that of full lighting (input data is 15) is an ideal light intensity. However, when the laser light source has laser light emission characteristics with respect to the PWM signal as shown in FIG. 20B, the laser light emission intensity described below is obtained. That is, in the first and second stages of the PWM signal, the laser light emission intensity thereof does not reach the light intensity of $\frac{1}{15}$ of that of the full light emission, and in the third stage, the laser light emission intensity reaches the light intensity of about $\frac{1}{15}$ of that of the full light emission. In this case, the light intensity of a laser beam at a time when the value of the PWM signal is 3 with respect to input data 1 is close to the ideal light intensity, and hence in the light intensity error table, 3 is set to the output data GDATA. Similarly, in the light intensity error table, optimum values of the output data GDATA are set also for the other input data based on the laser light emission characteristics with respect to the PWM signal shown in FIG. 20B.

Meanwhile, even when the value of the PWM signal closest to the ideal light intensity is selected for the input data (Fpix+MDATA), a slight error may be caused in an exposure light intensity. Therefore, the error amount MDATA' is provided in the light intensity error table, and the error amount MDATA' represents an error amount at a time when the input data (Fpix+MDATA) is caused to emit light with the output data GDATA. Two table values of the light intensity error table, that is, the output data GDATA and the error amount MDATA' are set based on values determined experimentally, and the light intensity error table is held in advance in a RAM (not shown) or the like of the CPU 303. For example, in a factory assembly adjustment step of an image forming apparatus, a light emission intensity may be measured for each light scanning device, and the light intensity error table may be stored in the memory 302 so as to be used for performing the processing of FIG. 18.

FIG. 19B is a table for showing processing results at a time when the threshold value L is 4 and the maximum density value DATAmax is 16 in the processing of FIG. 18. In FIG. 18, the image data (pixel value) before the filtering refers to the image data of FIG. 16A, and the image data (pixel value) obtained by moving an image center of gravity downward in the length direction of the table by the filtering in Step S2002 of FIG. 18 relative to the data of FIG. 16A corresponds to the image data of FIG. 16B. In the processing illustrated in FIG. 18, when the image data after the filtering (FIG. 16B) is the same value or a smaller value relative to the image data before the filtering (FIG. 16A), the processing on the pixel value of the corresponding pixel is not performed (NO in Step S2003). Therefore, the same data value as that of the image data after the filtering (FIG. 16B) is set to the image data (pixel value) of each pixel in the first to fourth lines and the sixth line of FIG. 19B.

Meanwhile, the image data value 2 after the filtering of each pixel in the fifth line shown in FIG. 16B is increased relative to the image data value 0 before the filtering shown in Table 16A, and hence the processing in Steps S2004 to S2009 of FIG. 18 is performed. That is, when N is 0, the post-processing pixel value Fpix is 2, the carry-over data MDATA is 0, the threshold value L is 4, and the maximum density value DATAmax is 16. Thus, the processing in Step S2008 is performed. In Step S2008, the output data GDATA of 3 and the error amount MDATA' of 0.2, which correspond to the input data (Fpix+MDATA=2), are read from the light intensity error table. Then, in Step S2009, 3 is set to the post-processing pixel value Fpix, and 0.2 (=0+0.2) is set to the carry-over data MDATA. When N is 1, the post-processing pixel value Fpix is 2, the carry-over data MDATA is 0.2, the threshold value L is 4, and the maximum density value DATAmax is 16. Thus, the processing in Step S2008 is performed. In Step S2008, the output data GDATA of 3 and the error amount MDATA' of 0.2, which correspond to the input data (Fpix+MDATA=2), are read from the light intensity error table. In this case, the input data (Fpix+MDATA) is 2.2 (=2+0.2), but the input data of the light intensity error table is an integer value. Therefore, a numerical value below a decimal point of the input data is rounded down, and reading is performed with the input data being 2. Then, as the input data for reading the light intensity error table, input data obtained by rounding down decimal places is used. As a result, in Step S2009, 3 is set to the post-processing pixel value Fpix, and 0.4 (=0.2+0.2) obtained by adding the value of 0.2 below a decimal point rounded down at a time of reading the light intensity error table to the error amount MDATA' of 0.2 is set to the carry-over data MDATA.

When N is 2, the post-processing pixel value Fpix is 2, the carry-over data MDATA is 0.4, the threshold value L is 4, and the maximum density value DATAmax is 16. Thus, the processing in Step S2008 is performed. In Step S2008, the output data GDATA of 3 and the error amount MDATA' of 0.2, which correspond to the input data (Fpix+MDATA=2), are read from the light intensity error table. Then, in Step S2009, 3 is set to the post-processing pixel value Fpix, and 0.6 (=0.2+0.4) obtained by adding the value of 0.4 below a decimal point rounded down at a time of reading the light intensity error table to the error amount MDATA' of 0.2 is set to the carry-over data MDATA. When N is 3, the post-processing pixel value Fpix is 2, the carry-over data MDATA is 0.6, the threshold value L is 4, and the maximum density value DATAmax is 16. Thus, the processing in Step S2008 is performed. In Step S2008, the output data GDATA of 3 and the error amount MDATA' of 0.2, which correspond to the input data (Fpix+MDATA=2), are read from the light intensity error table. Then, in Step S2009, 3 is set to the post-processing pixel value Fpix, and 0.8 (=0.2+0.6) obtained by adding the value of 0.6 below a decimal point rounded down at a time of reading the light intensity error table to the error amount MDATA' of 0.2 is set to the carry-over data MDATA.

When N is 4, the post-processing pixel value Fpix is 2, the carry-over data MDATA is 0.8, the threshold value L is 4, and the maximum density value DATAmax is 16. Thus, the processing in Step S2008 is performed. In Step S2008, the output data GDATA of 3 and the error amount MDATA' of 0.2, which correspond to the input data (Fpix+MDATA=2), are read from the light intensity error table. Then, in Step S2009, 3 is set to the post-processing pixel value Fpix, and 1.0 (=0.2+0.8) obtained by adding the value of 0.8 below a decimal point rounded down at a time reading the light intensity error table to the error amount MDATA' of 0.2 is set to the carry-over data MDATA. When N is 5, the post-processing pixel value Fpix is 2, the carry-over data MDATA is 1.0, the threshold value L is 4, and the maximum density value DATAmax is 16. Thus, the processing in Step S2008 is performed. In Step S2008, the output data GDATA of 4 and the error amount MDATA' of 0.5, which correspond to the input data (Fpix+MDATA=3), are read from the light intensity error table. Then, in Step S2009, 4 is set to the post-processing pixel value Fpix, and the error amount MDATA' of 0.5 is set to the carry-over data MDATA because there is no value below a decimal point rounded down at a time of reading the light intensity error table.

When N is 6, the post-processing pixel value Fpix is 2, the carry-over data MDATA is 0.5, the threshold value L is 4, and the maximum density value DATAmax is 16. Thus, the processing in Step S2008 is performed. In Step S2008, the output data GDATA of 3 and the error amount MDATA' of 0.2, which correspond to the input data (Fpix+MDATA=2), are read from the light intensity error table. Then, in Step S2009, 3 is set to the post-processing pixel value Fpix, and 0.7 (=0.2+0.5) obtained by adding the value of 0.5 below a decimal point rounded down at a time of reading the light intensity error table to the error amount MDATA' of 0.2 is set to the carry-over data MDATA. When N is 7, the post-processing pixel value Fpix is 2, the carry-over data MDATA is 0.7, the threshold value L is 4, and the maximum density value DATAmax is 16. Thus, the processing in Step S2008 is performed. In Step S2008, the output data GDATA of 3 and the error amount MDATA' of 0.2, which correspond to the input data (Fpix+MDATA=2), are read from the light intensity error table. Then, in Step S2009, 3 is set to the post-processing pixel value Fpix, and 0.9 (=0.2+0.7) obtained by adding the value of 0.7 below a decimal point rounded down at a time of reading the light intensity error table to the error amount MDATA' of 0.2 is set to the carry-over data MDATA.

When N is 8, the post-processing pixel value Fpix is 2, the carry-over data MDATA is 0.9, the threshold value L is 4, and the maximum density value DATAmax is 16. Thus, the processing in Step S2008 is performed. In Step S2008, the output data GDATA of 3 and the error amount MDATA' of 0.2, which correspond to the input data (Fpix+MDATA=2), are read from the light intensity error table. Then, in Step S2009, 3 is set to the post-processing pixel value Fpix, and 1.1 (=0.2+0.9) obtained by adding the value of 0.9 below a decimal point rounded down at a time of reading the light intensity error table to the error amount MDATA' of 0.2 is set to the carry-over data MDATA. When N is 9, the post-processing pixel value Fpix is 2, the carry-over data MDATA is 1.1, the threshold value L is 4, and the maximum density value DATAmax is 16. Thus, the processing in Step S2008 is performed. In Step S2008, the output data GDATA of 4 and the error amount MDATA' of 0.5, which correspond to the input data (Fpix+MDATA=3), are read from the light intensity error table. Then, in Step S2009, 4 is set to the post-processing pixel value Fpix, and 0.6 (=0.5+0.1) obtained by adding the value of 0.1 below a decimal point rounded down at a time of reading the light intensity error table to the error amount MDATA' of 0.5 is set to the carry-over data MDATA. When N is 10, the post-processing pixel value Fpix is 2, the carry-over data MDATA is 0.6, the threshold value L is 4, and the maximum density value DATAmax is 16. Thus, the processing in Step S2008 is performed. In Step S2008, the output data GDATA of 3 and the error amount MDATA' of 0.2, which correspond to the input data (Fpix+MDATA=2), are read from the light intensity error table. Then, in Step S2009, 3 is set to the post-processing pixel value Fpix, and 0.8 (=0.2+0.6) obtained by adding the value of 0.6 below a decimal point rounded down at a time of reading the light intensity error table to the error amount MDATA' of 0.2 is set to the carry-over data MDATA.

When the image data of FIG. 19B at a time when correction processing is performed according to the embodiment is compared with the image data of FIG. 16B at a time when correction of an error is not performed, the image data in the fifth line has a density value of 3 or 4 in FIG. 19B, and hence an image data amount representing a pixel value is increased. With this, a decreased portion of the light intensity of a laser beam caused by the linearity defect is corrected, and the image density of each pixel is controlled so as to be kept at a predetermined density.

As described above, according to the embodiment, satisfactory image quality can be obtained by correcting uneven image density of an image, which occurs in a direction corresponding to a rotational direction of a photosensitive member, and preventing the occurrence of density fluctuation caused by a linearity defect. In the embodiment, an exposure amount of pixels including a surrounding pixel is adjusted so that an error of the exposure amount caused by the linearity defect is cancelled. With this, the exposure control resolution (pulse width control resolution of the PWM signal) per pixel is not required to be increased, and the exposure amount can be adjusted with high accuracy at low cost. Further, banding that occurs due to a rotation speed fluctuation of a photosensitive drum can be corrected without causing an error in the movement amount of an image center of gravity and a density fluctuation. Further, banding that occurs due to an optical face tangle error of a rotary polygon mirror can also be corrected without causing error in the movement amount of an image center of gravity and a density fluctuation. Further, in the embodiment, an image is formed with the use of output data read from the light intensity error table based on image data (pixel value), and an error amount read from the light intensity error table is added to a pixel value of an adjacent pixel in the main scanning direction. When the image data to be added spreads in the sub-scanning direction, an error is caused in the movement amount of an image center of gravity in the sub-scanning direction, and the effect of banding correction is decreased. Meanwhile, when the image data to be added is added only in the main scanning direction, an error of an exposure amount caused by the linearity defect can be cancelled without decreasing the effect of banding correction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-155192, filed Aug. 5, 2015, which is hereby incorporated by reference herein in its entirety.

What is claimed is:

1. A data processing method for an image forming apparatus, wherein the image forming apparatus comprises:
 a light source comprising a plurality of light emitting points;
 a photosensitive member configured to rotate in a first direction so that a latent image is formed on the photosensitive member with light beams emitted from the light source; and
 a deflecting unit provided with a rotary polygon mirror having a plurality of reflection surfaces and rotated about a rotary shaft, the deflecting unit being configured to deflect the light beams by the rotary polygon mirror so that the light beams emitted from the light source scan on the photosensitive member,
 the data processing method comprising:
 a first correction step of correcting a pixel data of an adjacent pixel in the first direction with respect to a pixel included in a scanning line of interest in order to correct sparseness and denseness of density of an image occurring in the first direction caused by deviation of irradiation positions in the first direction of the light beams deflected by the plurality of reflection surfaces; and
 a second correction step of correcting the pixel data of the adjacent pixel in the first direction as a correction result of the first correction step to increase a density value indicated by the pixel data of the adjacent pixel in the first direction as the correction result of the first correction step in a case where the density value is not larger than a predetermined value.

* * * * *